United States Patent
Crivella et al.

(10) Patent No.: US 11,123,835 B2
(45) Date of Patent: Sep. 21, 2021

(54) POSITIONING DEVICE FOR A DRILLING APPARATUS

(71) Applicant: The Boeing Company, Chicago, IL (US)

(72) Inventors: Michelle Crivella, Charleston, SC (US); Ashley Susan Combs, North Charleston, SC (US); Dennis R. Mathis, Charleston, SC (US); Matthew James Berden, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/540,928

(22) Filed: Aug. 14, 2019

(65) Prior Publication Data

US 2021/0046601 A1 Feb. 18, 2021

(51) Int. Cl.
*B23Q 17/24* (2006.01)
*B25H 1/00* (2006.01)
(Continued)

(52) U.S. Cl.
CPC .......... *B23Q 17/2419* (2013.01); *B23B 49/02* (2013.01); *B23Q 17/2233* (2013.01);
(Continued)

(58) Field of Classification Search
CPC .......... Y10T 408/3639; Y10T 408/5623; Y10T 408/5622; Y10T 408/3839; B23B 49/00;
(Continued)

(56) References Cited

U.S. PATENT DOCUMENTS 3,728,027 A * 4/1973 Watanabe .............. B23Q 17/24
356/13
4,279,552 A * 7/1981 Epstein ................ B25H 1/0078
408/112
(Continued)

FOREIGN PATENT DOCUMENTS

| EP | 0187409 A1 | 7/1986 | |
| FR | 2925376 A1 * | 6/2009 | ............. B23Q 17/24 |
| GB | 2299285 A | 10/1996 | |

OTHER PUBLICATIONS

"Extended European Search Report Received for EP Application No. 20178524.5-1017", dated Nov. 18, 2020, 7 Pages.

*Primary Examiner* — Eric A. Gates
*Assistant Examiner* — Chwen-Wei Su

(57) ABSTRACT

A positioning device for positioning a drilling tool of a drilling apparatus relative to a workpiece includes a cage mounted to the drilling apparatus such that the cage at least partially surrounds the drilling tool. The cage includes an end portion that includes an alignment surface that is configured to be engaged in physical contact with a workpiece surface of the workpiece. The alignment surface of the cage is oriented relative to a centerline axis of the drilling tool such that the centerline axis extends approximately normal to the workpiece surface when the alignment surface of the cage is in contact with the workpiece surface. The positioning device also includes a laser projector mounted to the cage such that the laser projector is configured to project an illuminated dot onto the workpiece surface that indicates where the centerline axis of the drilling tool intersects the workpiece surface.

16 Claims, 8 Drawing Sheets

(51) Int. Cl.
  *B23B 49/02* (2006.01)
  *B23Q 17/22* (2006.01)
  *B23B 49/00* (2006.01)
(52) U.S. Cl.
  CPC ............ *B25H 1/0092* (2013.01); *B23B 49/00* (2013.01); *B23B 2215/04* (2013.01); *B23B 2260/092* (2013.01); *B23B 2260/128* (2013.01); *Y10T 408/3839* (2015.01)
(58) Field of Classification Search
  CPC ............ B23B 2251/04; B23Q 17/2233; B23Q 17/2419; B23Q 3/069; B23Q 3/183; B25H 1/0078; B25H 1/0092
  USPC ............... 362/119, 249.02, 553; 33/286, 638
  See application file for complete search history.

(56) References Cited

U.S. PATENT DOCUMENTS

| | | | | |
|---|---|---|---|---|
| 4,613,262 | A * | 9/1986 | Woods | B23Q 9/0014 |
| | | | | 408/111 |
| 4,778,317 | A * | 10/1988 | Earle, III | B23Q 17/2233 |
| | | | | 408/13 |
| 5,741,096 | A * | 4/1998 | Olds | B23Q 17/22 |
| | | | | 408/1 R |
| 6,413,022 | B1 * | 7/2002 | Sarh | B21J 15/10 |
| | | | | 408/16 |
| 9,086,271 | B2 * | 7/2015 | Melikian | G01B 11/14 |
| 10,639,804 | B2 * | 5/2020 | Boria | B25H 1/0064 |

\* cited by examiner

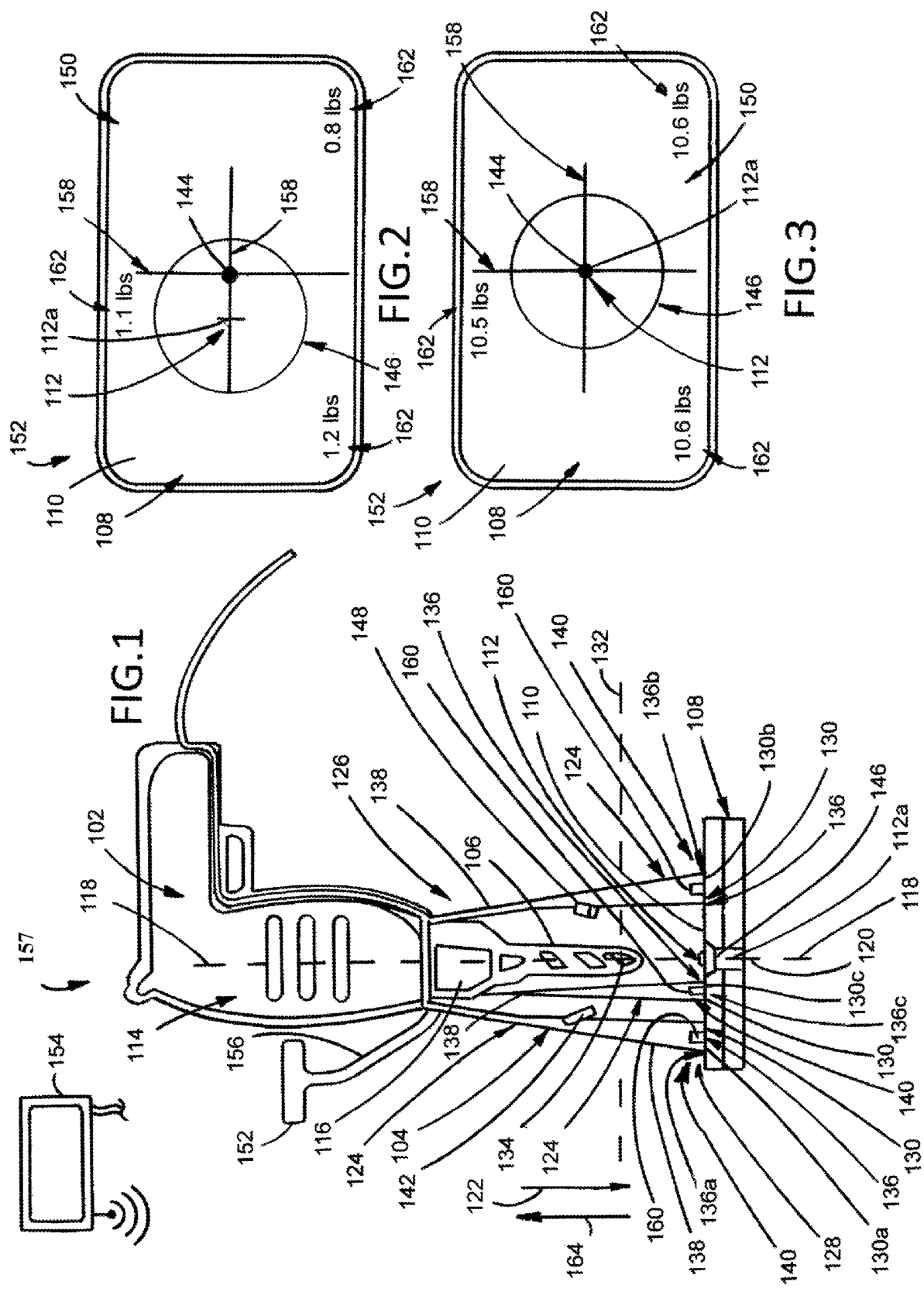

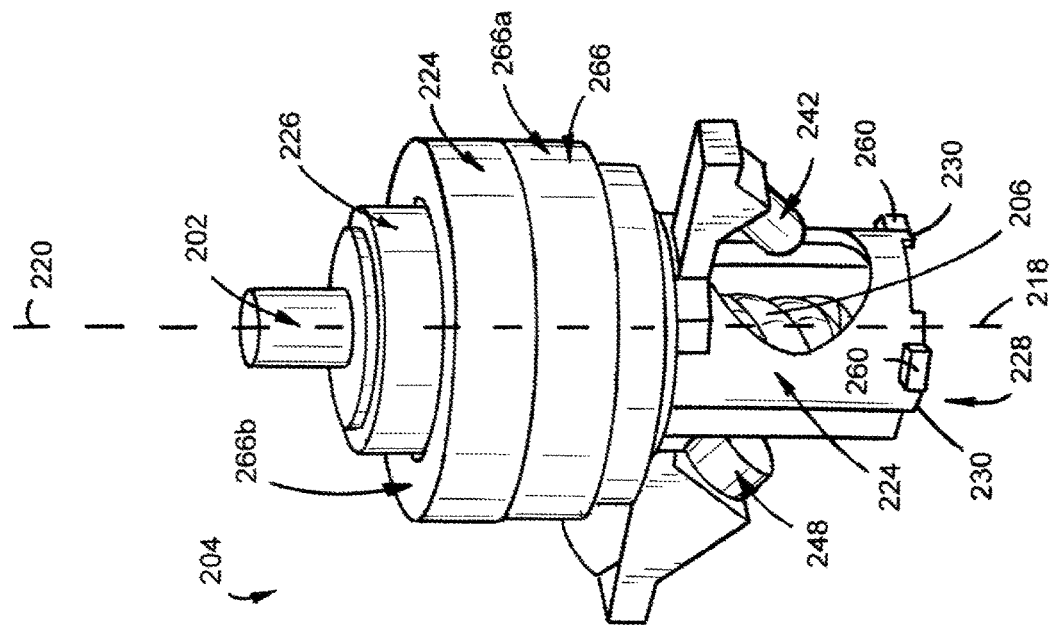
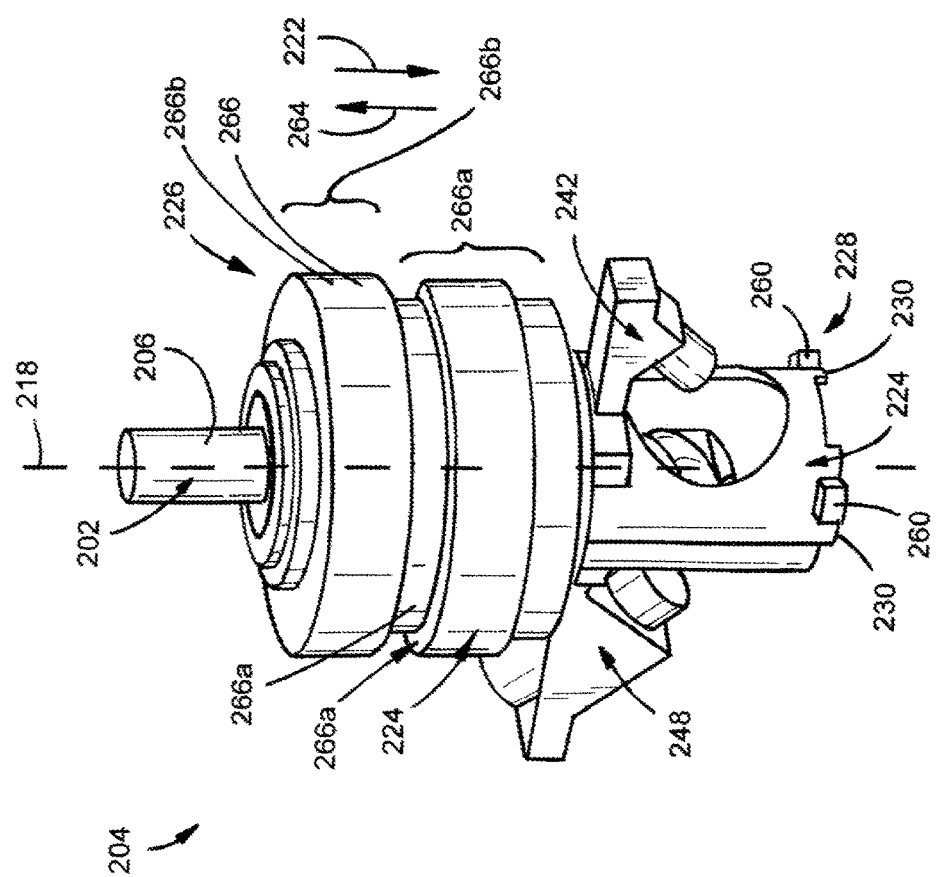

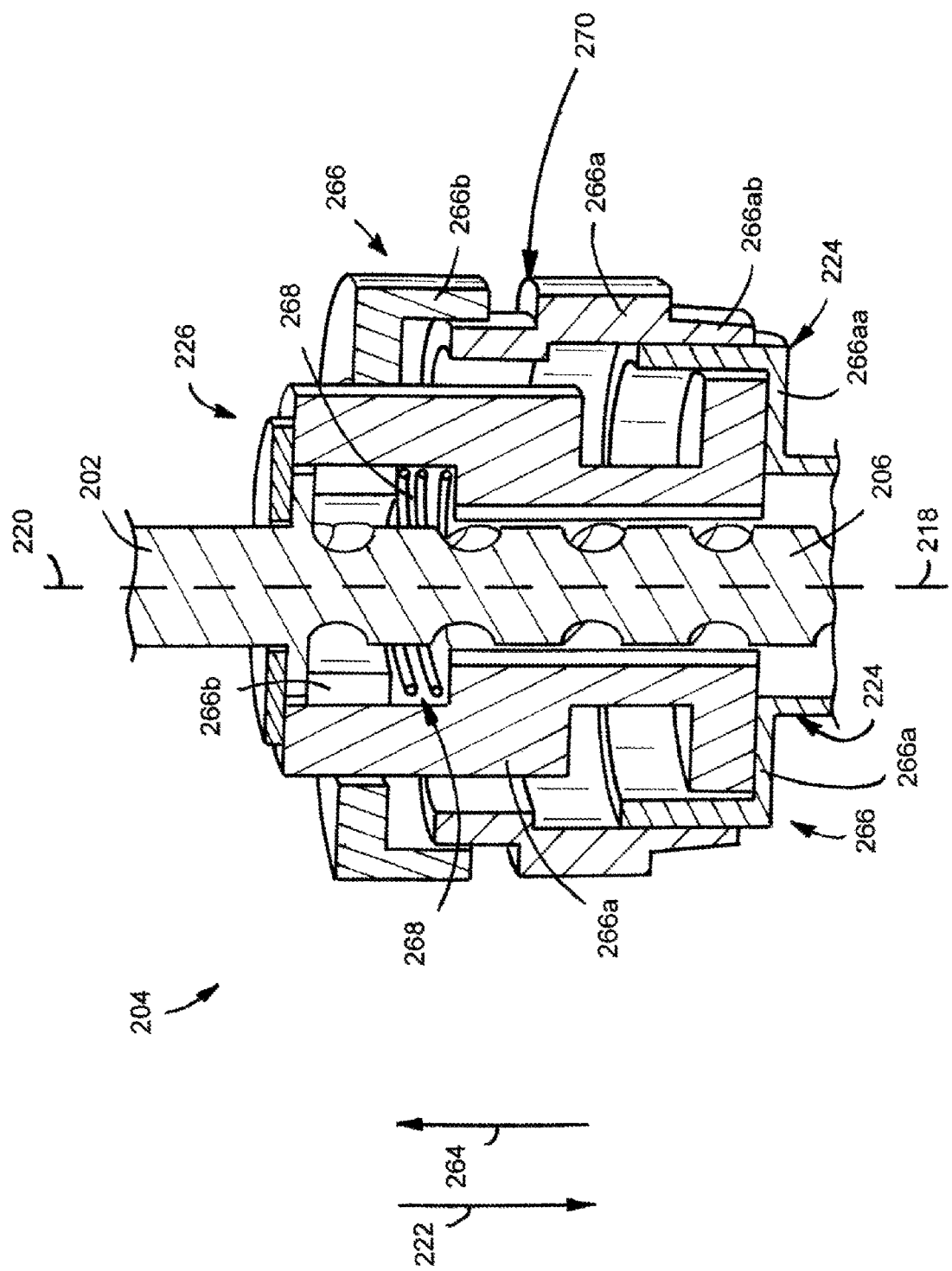

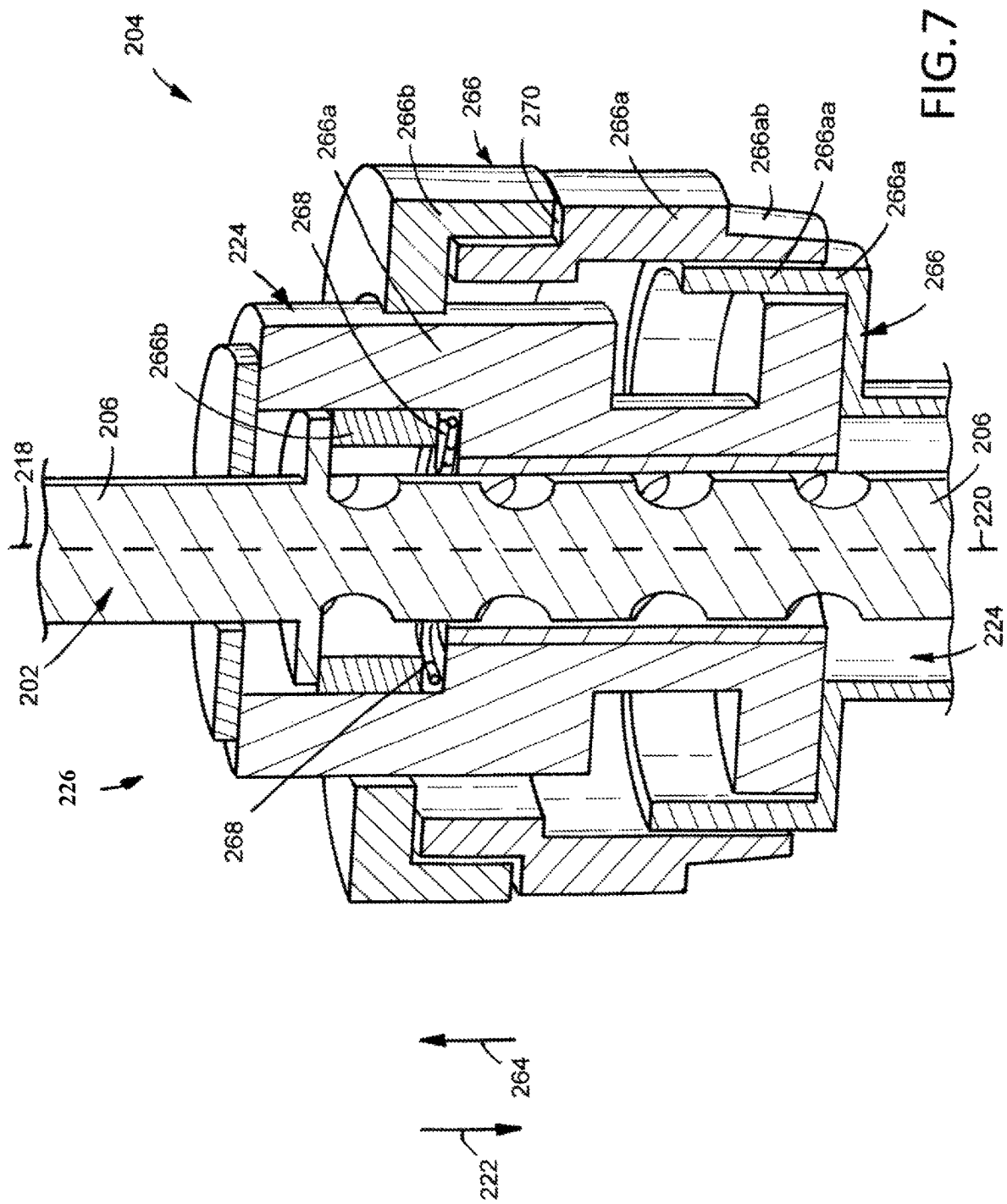

POSITIONING DEVICE FOR A DRILLING APPARATUS

BACKGROUND

In aircraft maintenance, repair, and overhaul, fasteners (e.g., rivets, bolts, screws, etc.) must be removed to replace damaged or structurally compromised components. The process of removing aircraft fasteners usually requires a drill positioned in the center of the fastener, normal to the surface of the component surrounding the fastener. If the drill is not positioned accurately, the attaching substructure can be damaged, for example in the form of oversized, misshapen (e.g., disfigured, etc.), and/or non-normal holes that may require expensive rework of the substructure. For example, if the drill is not centered with the fastener, the drill may disfigure the hole of the fastener with an oblong shape, while drills that are not positioned normal to the component surface may disfigure the hole of the fastener with a snowman shape. Moreover, repeated drilling of fasteners with the drill positioned out of normal with respect to the component surface may increase the rate of broken drill bits.

One method to position the drill bit in the center of the fastener is to first use a small punch and hammer to place an indent in the center of the fastener and then place the drill bit into the indentation. But, while this operation can facilitate centering the drill bit with the fastener, the drill bit may still be out of normal with the component surface. Moreover, while it is known to provide hand drills with guide attachments that facilitate orienting the drill bit normal to the component surface, such guide attachments do not aide with aligning the drill bit with the center of the fastener. Other solutions for accurately positioning drills suffer from the disadvantages of being costly, time-consuming, and/or labor intensive. For example, some drilling systems include magnetic targets placed inside the component structure (e.g., on the opposite side of the component to the side being drilled into, etc.) thereby requiring access to the inside of the aircraft, which may increase the cost, time, and/or labor required to complete the drilling operation. Moreover, and for example, automated (e.g., robotic, etc.) drilling machines are typically expensive and may require a relatively considerable investment in software programming for the various different components that require drilling.

SUMMARY

In one aspect, a positioning device is provided for positioning a drilling tool of a drilling apparatus relative to a workpiece. The positioning device includes a cage configured to be mounted to the drilling apparatus such that the cage at least partially surrounds the drilling tool of the drilling apparatus. The cage includes an end portion that includes an alignment surface that is configured to be engaged in physical contact with a workpiece surface of the workpiece. The alignment surface of the cage is oriented relative to a centerline axis of the drilling tool when the cage is mounted to the drilling apparatus such that the centerline axis extends approximately normal to the workpiece surface when the alignment surface of the cage is in contact with the workpiece surface. The positioning device also includes a laser projector mounted to the cage such that the laser projector is configured to project an illuminated dot onto the workpiece surface that indicates where the centerline axis of the drilling tool intersects the workpiece when the alignment surface of the cage is in contact with the workpiece surface.

In another aspect, a drilling apparatus assembly is provided. The drilling apparatus assembly includes a drilling apparatus having a body, a chuck held by the body, and a drilling tool held by the chuck. The drilling apparatus assembly includes a positioning device mounted to the drilling apparatus for positioning the drilling tool relative to a workpiece. The positioning device includes a cage that at least partially surrounds the drilling tool of the drilling apparatus. The cage includes an end portion that includes an alignment surface that is configured to be engaged in physical contact with a workpiece surface of the workpiece. The alignment surface of the cage is oriented relative to a centerline axis of the drilling tool such that the centerline axis extends approximately normal to the workpiece surface when the alignment surface of the cage is in contact with the workpiece surface. The positioning device also includes a laser projector mounted to the cage such that the laser projector is configured to project an illuminated dot onto the workpiece surface that indicates where the centerline axis of the drilling tool intersects the workpiece surface when the alignment surface of the cage is in contact with the workpiece surface. The illuminated dot projected by the laser projector onto the workpiece surface is configured to be adjustably aligned with a target drilling location on the workpiece surface by moving the drilling apparatus relative to the workpiece surface.

In another aspect, a method is provided for drilling a workpiece. The method includes engaging an alignment surface of a positioning device mounted to a drilling apparatus into physical contact with a workpiece surface of the workpiece such that a centerline axis of a drilling tool of the drilling apparatus extends approximately normal to the workpiece surface; projecting an illuminated dot onto the workpiece surface that indicates where the centerline axis of the drilling tool intersects the workpiece surface; aligning the illuminated dot with a target drilling location on the workpiece surface by moving the drilling apparatus relative to the workpiece surface; and drilling the target drilling location with the drilling tool.

BRIEF DESCRIPTION OF THE DRAWINGS

FIG. 1 is a schematic diagram illustrating a drilling apparatus assembly including an implementation of a positioning device.

FIG. 2 illustrates a viewing area of a display of the positioning device shown in FIG. 1 according to an implementation.

FIG. 3 is another view of the viewing area shown in FIG. 2.

FIG. 4 is a perspective view of a positioning device according to an implementation wherein the positioning device is collapsible along the length thereof.

FIG. 5 is another perspective view of the positioning device shown in FIG. 4 illustrating a collapsed position of the positioning device according to an implementation.

FIG. 6 is a cross-sectional view of the positioning device shown in FIGS. 4 and 5 illustrating an extended position of the positioning device according to an implementation.

FIG. 7 is another cross-sectional view of the positioning device shown in FIGS. 4-6 illustrating the extended position of the positioning device shown in FIG. 5.

DETAILED DESCRIPTION

Figure 10:
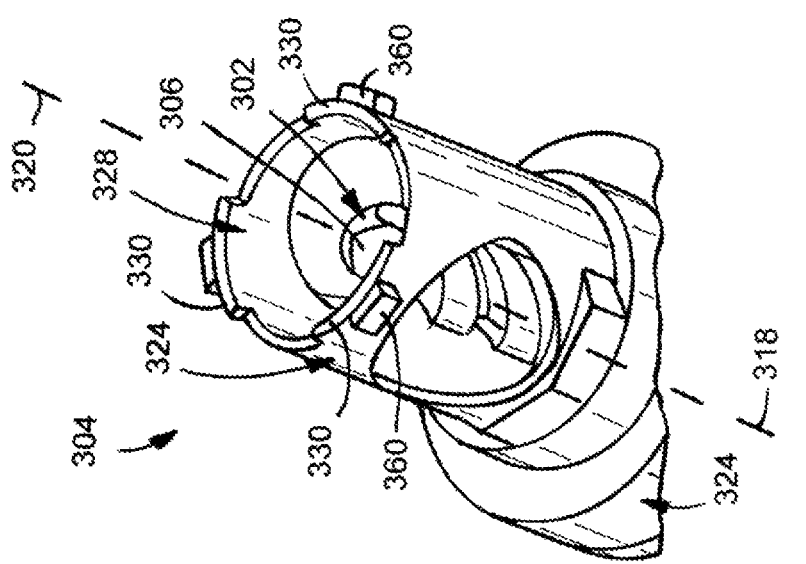
FIG. 10 is a perspective view of a portion of the positioning device shown in FIGS. 8 and 9.

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain implementations of the present disclosure provide a positioning device for positioning a drilling tool of a drilling apparatus relative to a workpiece. The positioning device includes a cage configured to be mounted to the drilling apparatus such that the cage at least partially surrounds the drilling tool of the drilling apparatus. The cage includes an end portion that includes an alignment surface that is configured to be engaged in physical contact with a workpiece surface of the workpiece. The alignment surface of the cage is oriented relative to a centerline axis of the drilling tool when the cage is mounted to the drilling apparatus such that the centerline axis extends approximately normal to the workpiece surface when the alignment surface of the cage is in contact with the workpiece surface. The positioning device also includes a laser projector mounted to the cage such that the laser projector is configured to project an illuminated dot onto the workpiece surface that indicates where the centerline axis of the drilling tool intersects the workpiece surface when the alignment surface of the cage is in contact with the workpiece surface.

Certain implementations of the present disclosure facilitate positioning a drilling tool of a drilling apparatus both normal to a workpiece surface and aligned with a target drilling location on the workpiece surface. Certain implementations of the present disclosure reduce damage caused to the workpiece and/or other structures (e.g., attaching substructure, etc.) resulting from drilling operations. For example, certain implementations of the present disclosure reduce the occurrence of oversized, misshapen (e.g., disfigured, etc.), and/or non-normal holes. Certain implementations of the present disclosure reduce the number of broken drilling tools resulting from repeated drilling operations. Certain implementations of the present disclosure reduce the cost of performing drilling operations, reduce the time-required to perform drilling operations, and/or reduce the labor required to perform drilling operations.

With references now to the figures, a schematic diagram of a drilling apparatus assembly is provided in FIG. 1. The drilling apparatus assembly 100 includes a drilling apparatus 102 and one implementation of a positioning device 104 for positioning a drilling tool 106 of the drilling apparatus 102 relative to a workpiece 108. As will be described in more detail below, the positioning device 104 is configured to facilitate positioning the drilling apparatus 102 such that: (1) the drilling tool 106 extends (e.g., is oriented, etc.) approximately normal to a surface 110 of the workpiece 108 that is being drilled; and (2) the drilling tool 106 is approximately or adjustably aligned with a target drilling location 112 on the workpiece surface 110.

Referring first to the drilling apparatus 102, the drilling apparatus 102 includes a body 114, a chuck 116, and the drilling tool 106. The chuck 116 is held by the body 114 such that the chuck 116 is configured to rotate relative to the body 114 about an axis 118 of rotation during operation of the drilling apparatus 102. The drilling apparatus 102 includes any suitable driving mechanism (not shown) operatively connected to the chuck 116 for driving rotation of the chuck 116 about the axis 118 of rotation (i.e., for exerting a torque on the chuck 116 that rotates the chuck 116 about the axis 118 of rotation), such as, but not limited to, an electric motor, a hand crank, a combustion engine, and/or the like.

As shown in FIG. 1, the drilling tool 106 is held by the chuck 116 such that the axis 118 of rotation of the chuck 116 is aligned with a centerline axis 120 of the drilling tool 106. The drilling tool 106 is secured to the chuck 116 such that the drilling tool 106 is configured to rotate along with the chuck 116 about the axis 118 of rotation and about the centerline axis 120. Specifically, the drilling tool 106 is rigidly secured to the chuck 116 such that the chuck 116 translates the torque provided by the driving mechanism to the drilling tool 106 to thereby rotate the drilling tool 106 about the axis 118 of rotation and the centerline axis 120. In some examples, the drilling tool 106 is releasably held by the chuck 116 such that the drilling tool 106 can be selectively secured to and removed from the drilling apparatus 102, for example for repair or replacement of the drilling tool 106, and/or for servicing, storing, moving, maintaining and/or the like of the drilling apparatus 102.

In operation of the drilling apparatus 102 to drill into the workpiece surface 110, the drilling tool 106 is rotated about the axes 118 and 120 in a cutting direction (e.g., clockwise, counter-clockwise, etc.) that enables the drilling tool 106 is cut into the workpiece surface 110. As the drilling tool 106 is rotated about the axes 118 and 120 in the cutting direction, the drilling tool 106 is moved along the axes 118 and 120 toward (e.g., in the direction of the arrow 122, etc.) and into physical contact with the workpiece surface 110. The drilling tool 106 is forced against (e.g., pressed into, etc.) the workpiece surface 110 along the axes 118 and 120 (e.g., in the direction of the arrow 122, etc.) to provide a contact force between the drilling tool 106 and the workpiece surface 110. The rotation of the drilling tool 106 in the cutting direction and the contact force between the drilling tool 106 and the workpiece surface 110 causes the drilling tool 106 to cut (e.g., drill, etc.) into the workpiece surface 110.

In some implementations, such as, but not limited to, the hand-held implementation of the drilling apparatus 102 shown in FIG. 1, the body 114 of the drilling apparatus 102 is: (1) moved along the axes 118 and 120 toward the workpiece surface 110 (e.g., in the direction of the arrow 122, etc.) to thereby move the drilling tool 106 toward and into physical contact with the workpiece surface 110; and (2) a force is exerted on the body 114 to force the drilling tool 106 against the workpiece surface 110 and thereby provide the contact force between the drilling tool 106 and the workpiece surface 110. The movement of, and force exerted on, the body 114 of the drilling apparatus 102 to move the drilling tool 106 toward the workpiece surface 110 and provide the contact force between the drilling tool 106 and the workpiece surface 110 is: (1) fully automated in some implementations; (2) assisted in some implementations (e.g., semi-automated, etc.); and (3) fully manual (e.g., performed wholly by an operator, etc.) in some implementations. For example, an operator holding the drilling apparatus 102 manually moves the body 114 of the drilling apparatus 102 and manually exerts the force on the body 114 that provides the contact force between the drilling tool 106 and the workpiece surface 110 in the hand-held implementation of FIG. 1.

In other implementations, the drilling tool 106 moves relative to the body 114 of the drilling apparatus 102 to move the drilling tool 106 along the axes 118 and 120 toward and into physical contact with the workpiece surface 110 (e.g., in the direction of the arrow 122, etc.); and the contact force between the drilling tool 106 and the workpiece surface 110 is provided by exerting a force on the drilling tool 106 to force the drilling tool 106 against the workpiece surface 110. The drilling apparatus 102 includes any suitable mechanism, structure, and/or the like that enables the drilling tool 106 to move along the axes 118 and 120 relative to the body 114 of the drilling apparatus, such as, but not limited to, a mechanical quill, a bearing, and/or the like. The movement of, and force exerted on, the drilling tool 106 to move the drilling tool 106 relative to the body 114 toward the workpiece surface 110 and provide the contact force between the drilling tool 106 and the workpiece surface 110 is: (1) fully automated in some implementations (e.g., using an electrical, hydraulic, and/or pneumatic linear actuator of the drilling apparatus, etc.); (2) assisted (e.g., semi-automated, etc.) in some implementations (e.g., using a hydraulic cylinder, a pneumatic cylinder, a gas spring, etc.); and (3) fully manual (e.g., performed wholly by an operator directly and/or indirectly exerting a force on the drilling tool 106, etc.) in some implementations. Examples fully automated implementations include an implementation wherein the drilling apparatus 102 is a drill press that includes a linear actuator (not shown) that automatically moves the drilling tool 106 relative to the body 114 and automatically exerts a force on the drilling tool 106 that provides the contact force between the drilling tool 106 and the workpiece surface 110, for example upon activation by an operator and/or a computer. Another example of a fully automated implementation is an implementation wherein the drilling apparatus 102 is a hand-held drilling apparatus that includes a linear actuator and/or other mechanism that is configured to automatically move the drilling tool 106 relative to the body 114 and to automatically exert a force on the drilling tool 106 that provides the contact force, for example upon activation of the drilling apparatus 102 by an operator holding the drilling apparatus 102. Examples of manual automation include an implementation wherein the drilling apparatus 102 is a drill press that includes a hand crank that can be manually turned by an operator to indirectly move the drilling tool 106 relative to the body 114 and indirectly exert a force on the drilling tool 106 that provides the contact force between the drilling tool 106 and the workpiece surface 110.

In the exemplary implementations shown herein, the drilling tool 106 is a drill bit, and more specifically a twist drill bit. But, the drilling tool 106 additionally or alternatively can include any type of drill bit, such as, but not limited to, a step drill bit, an unbit drill bit, a hole saw, a center and spotting drill bit, a core drill bit, a countersink bit, an ejector drill bit, a gun drill bit, an indexable drill bit, a left-hand bit, a metal spade bit, a straight fluted bit, a trepan, a lip and spur drill bit, a wood spade bit, a spoon bit, a forstner bit, a center bit, an auger bit, a gimlet bit, a hinge sinker bit, an adjustable wood bit, a metal drill bit, a diamond core bit, a masonry drill bit, a glass drill bit, a PCB through-hole drill bit, an installer bit, a fishing bit, a flexible shaft bit, and/or the like. Moreover, the drilling tool 106 is not limited to including a drill bit. Rather, the drilling tool 106 additionally or alternatively may include any other type of drilling tool, such as, but not limited to, a tap, a die, and/or the like.

Although the drilling apparatus 102 is a portable hand-held drilling apparatus in the implementation of FIG. 1, the drilling apparatus 102 is not limited thereto. Rather, additionally or alternatively the drilling apparatus 102 includes any type of drilling apparatus, such as, but not limited to, a drill press, a drilling apparatus that is supported by a fixture and/or other structure (e.g., a hanging structure, a structure that mounts to the workpiece 108, a structure that is adjacent the workpiece 108, a structure that rests on and/or is attached to a floor, etc.), a less-portable drilling apparatus, and/or the like. Moreover, the drilling apparatus 102 is not limited to the corded electrical drilling apparatus 102 shown in the implementation of FIG. 1, but rather additionally or alternatively includes any other power source, such as, but not limited to, a battery powered electric drilling apparatus, a pneumatic powered drilling apparatus, a hydraulic powered drilling apparatus, and/or the like.

In the illustrated implementations, the workpiece 108 is an aircraft component (e.g., an internal panel, an external skin panel, etc.) and the target drilling location 112 is a fastener (e.g., a rivet, a bolt, a screw, etc.) that is being drilled out (e.g., removed, etc.) by the drilling apparatus 102. But, the workpiece 108 is not limited to being an aircraft component. Rather, the positioning device implementations shown and described herein are applicable to any type of workpiece into which a drilling operation is performed, such as, but not limited to, (e.g., an automotive component, a machine component, a marine component, a space component, a panel and/or other structure of a larger assembly, and/or the like. Moreover, the target drilling location 112 is not limited to being a fastener that is being drilled out by the drilling apparatus, but rather the positioning device implementations shown and described herein are applicable to any location of a workpiece into which a drilling operation is performed (e.g., a hole being drilled for subsequent installation of a fastener, the location of a vent, the location of a viewing opening, etc.). As will be described in more detail with respect to the positioning device 104, the workpiece surface 110 is not limited to being approximately planar (e.g., having an approximately two-dimensional (2D) shape, etc.) as is shown in FIG. 1. Rather, in addition or alternatively to being approximately planar, one or more segments of the workpiece surface 100 is has a three-dimensional (3D) shape (e.g., is contoured, etc.) in other implementations.

Referring now to the positioning device 104, the positioning device 104 includes a cage 124 mounted to the drilling apparatus 102. The cage 124 is configured to be mounted to the drilling apparatus 102. Specifically, the cage 124 extends a length from an end portion 126 to an opposite end portion 128. The end portion 126 of the cage 124 is mounted to the body 114 of the drilling apparatus 102 such that the cage at least partially surrounds the circumference of the drilling tool 106 of the drilling apparatus 102, for example as shown in FIG. 1. As illustrated in FIG. 1, the length of the cage 124 extends along the axes 118 and 120 when the cage 124 is mounted to the body 114 of the drilling apparatus 102.

The end portion 126 of the cage 124 is rigidly mounted to the body 114 of the drilling apparatus 102 such that the cage 124 remains stationary relative to the body 114 (i.e., does not rotate about the axes 118 and 120 along with the drilling tool 106) during operation of the drilling apparatus 102. In other words, during operation of the drilling apparatus 102, the drilling tool 106 rotates about the axis 118 of rotation and the centerline axis 120 relative to both the body 114 of the drilling apparatus and the cage 124 of the positioning device 104. The end portion 126 of the cage 124 is mounted to the body 114 of the drilling apparatus 102 using any method, means, structure, mechanism, manner, arrangement, connection, connector, device, and/or the like that enables the cage 124 to function as described and/or illustrated herein, such as, but not limited to, an adhesive, an interference fit, a snap-fit, a fastener (e.g., a threaded fastener, etc.), a latch, welding, brazing, an epoxy, a clip, a ring, a cotter pin, a quick release pin, a clevis, a clevis-type connection, a bayonet-type connection, a spring override, and/or the like. In the implementation of FIG. 1, the drilling apparatus 102 is a hand-held drilling apparatus and the cage 124 is configured to be mounted to the hand-held drilling apparatus 102, for example as is shown in FIG. 1.

The end portion 128 of the cage 124 includes an alignment surface 130. The alignment surface 130 is configured to be engaged in physical contact with the workpiece surface 110 of the workpiece 108 to position the centerline axis 120 of the drilling tool 106 approximately normal to the workpiece surface 110. Specifically, the alignment surface 130 of the cage 124 has one or more positions (e.g., location(s) along the axes 118 and 120, locations along axes 132 and 134 that extend perpendicular to the axes 118 and 120, orientations, angles, alignments, etc.) relative to the body 114 of the drilling apparatus 102 and has one or more geometries (e.g., orientation, angle, shape, contour, size, etc.) that, when the cage 124 is mounted to the drilling apparatus 102, are configured to orient the alignment surface 130 in a predetermined orientation relative to the centerline axis 120 of the drilling tool 106. The predetermined orientation of the alignment surface 130 relative to the centerline axis 120 of the drilling tool 106 is selected such that physical contact between the alignment surface 130 and the workpiece surface 110 (e.g., the act of engaging, i.e., moving, the alignment surface 130 into physical contact with the workpiece surface 110, etc.) orients the centerline axis 120 of the drilling tool 106 approximately normal to the workpiece surface 110 (e.g., at the target drilling location 112, etc.). In other words, the alignment surface 130 of the cage 124 is oriented relative to the centerline axis 120 of the drilling tool 106 when the cage is mounted to the drilling apparatus 102 such that the centerline axis 120 extends (e.g., is oriented, etc.) approximately normal to the workpiece surface 110 (e.g., at the target drilling location 112, etc.) when the alignment surface 130 is in physical contact with the workpiece surface 110. In some implementations, the alignment surface 130 of the cage 124 is oriented relative to the centerline axis 120 of the drilling tool 106 when the cage is mounted to the drilling apparatus 102 such that the centerline axis 120 extends (e.g., is oriented, etc.) precisely normal to the workpiece surface 110 (e.g., at the target drilling location 112, etc.) when the alignment surface 130 is in physical contact with the workpiece surface 110. As shown in FIG. 1, the alignment surface 130 engages in physical contact with the workpiece surface 110 at one or more contact areas 136.

The cage 124 includes any structure, configuration, arrangement, geometry, and/or the like that enables the cage 124 to function as described and/or illustrated herein (e.g., to provide the approximately normal orientation of centerline axis 120 of the drilling tool 106 relative to the workpiece surface 110, etc.). In the implementation of FIG. 1, the cage 124 includes three discrete legs 138 that each extend a length outwardly from the end portion 126 of the cage 124 to free end portions 140 thereof. The free end portions 140 of the legs 138 define the end portion 128 of the cage 124. End surfaces of the free end portions 140 define the alignment surface 130 of the cage 124. Accordingly, the alignment surface 130 of the implementation of FIG. 1 includes three discrete segments 130a, 130b, and 130c. As shown in FIG. 1, the segments 130a, 130b, and 130c engage in physical contact with the workpiece surface at respective contact areas 136a, 136b, and 136c.

Any other suitable structure that enables the cage 124 to function as described and/or illustrated herein is contemplated to be within the scope of the present disclosure. For example, in other implementations, one or more of the legs 138 is interconnected to one of more of the other legs 138, whether at the free end portions 140 thereof and/or at another location along the length of the legs 138. Moreover, in some other implementations, the end portion 128 of the cage 124 is defined by a single continuous segment that continuously surrounds (e.g., surrounds an approximate entirety of the circumference of, etc.) the drilling tool 106; wherein the continuous segment includes any shape(s) (e.g., a circular shape, a polygonal shape, a rectangular shape, a triangular shape, a quadrilateral shape, a curved shape, an oval shape, a hexagonal shape, an octagonal shape, etc.). The implementations shown in FIGS. 4-7 and 8-10 illustrate examples wherein the end portions 228 and 328 of a cage 224 and 324, respectively, can be considered to be defined by a single continuous segment or alternatively can be considered to have shorter legs (as compared to the legs 138 of the implementation of FIG. 1).

Moreover, and for example, other implementations of the cage 124 include any other number (e.g., one, two, four, five, etc.) of legs 138 and/or other implementations of the alignment surface 130 include any other number of discrete segments (e.g., one, two, four, five, etc.). In some implementations, the alignment surface 130 includes only a single continuous segment.

As briefly discussed above, the workpiece surface 110 is approximately planar along the area that includes the target drilling location 112 and the contact areas 136a-c in the implementation of FIG. 1. In other implementations wherein the area of the workpiece surface 110 that includes the contact area(s) 136 includes a 3D shape (e.g., is contoured, etc.), different discrete segments of the alignments surface 130 and/or different locations along the same segment of the alignment surface 130 may have different relative positions (e.g., different location(s) along the axes 118 and 120, different locations along the axis 132, different locations along the axis 134, different orientations, different angles, different alignments, etc.), for example to accommodate the 3D shape of the workpiece surface 110 in a manner that enables engagement between the alignment surface 130 and the workpiece surface 110 to orient the centerline axis 120 of the drilling tool 106 approximately normal to the workpiece surface 110 (e.g., at the target drilling location 112, etc.).

Optionally, one or more segments (e.g., the segments 130*a*, 130*b*, and/or 130*c*, etc.) of the alignment surface 130 has a shape that is complementary with the shape of the workpiece surface 110 at the corresponding contact area (e.g., the respective contact areas 136*a*, 136*b*, and/or 136*c*, etc.) of the workpiece surface 110. For example, in implementations wherein the area of the workpiece surface 110 that includes the contact area(s) 136 includes a 3D shape (e.g., is contoured, etc.), one or more of the segments of the alignment surface 130 may have a more complex geometry (e.g., orientation, shape, angle, contour, size, etc.) as compared to the approximately planar geometry shown in the implementation of FIG. 1 (e.g., to accommodate the 3D shape of the workpiece surface 110 in a manner that enables engagement between the alignment surface 130 and the workpiece surface 110 to orient the centerline axis 120 of the drilling tool 106 approximately normal to the workpiece surface 110, for example at the target drilling location 112, etc.).

As briefly described above, the positioning device 104 is configured to facilitate positioning the drilling apparatus 102 such that the drilling tool 106 is approximately or adjustably aligned with the target drilling location 112 on the workpiece surface 110. For example, the positioning device 104 includes a laser projector 142 mounted to the cage 124 such that the laser projector 142 is configured to project an illuminated dot (e.g., the illuminated dot 144 shown in FIGS. 2 and 3, etc.) onto the workpiece surface 110 that indicates where the centerline axis 120 of the drilling tool 106 intersects the workpiece surface 110 when the alignment surface 130 of the cage 124 is in contact with the workpiece surface 110. The drilling apparatus 102 can then be moved relative to the workpiece surface 110 to approximately align the illuminated dot, and thus the centerline axis 120 of the drilling tool 106, with the target drilling location 112 on the workpiece surface 110. In other words, the illuminated dot projected by the laser projector 142 onto the workpiece surface 110 is adjustably aligned with the target drilling location 112 on the workpiece surface 110 by moving the drilling apparatus 102 relative to the workpiece surface 110. In some implementations, the drilling apparatus 102 is moved relative to the workpiece surface 110 to precisely align the illuminated dot, and thus the centerline axis 120 of the drilling tool 106, with the target drilling location 112 on the workpiece surface 110.

For example, the laser projector 142 is mounted to the cage 124 at an orientation relative to the centerline axis 120 of the drilling tool 106 such that the laser beam projected by the laser projector 142 intersects the centerline axis 120. In other words, the laser projector 142 is mounted to the cage 124 such that the laser beam projected by the laser projector 142 is aimed to intersect the centerline axis 120 of the drilling tool 106. The laser beam projected by the laser projector 142 is aimed at the centerline axis 120 of the drilling tool 106 such that the laser beam intersects the centerline axis 120 at a location along the centerline axis 120 that corresponds to the position of the workpiece surface 110 along the centerline axis 120 when the alignment surface 130 of the cage 124 is engaged in physical contact with the workpiece surface 110. Accordingly, when the cage 124 is moved into physical contact with the workpiece surface 110, the point of intersection of the laser beam with the workpiece surface 110 is approximately aligned with the centerline axis 120 of the drilling tool 106. As is shown in FIGS. 2 and 3, the point of intersection between the laser beam and the workpiece surface 110 is marked by the illuminated dot (e.g., the illuminated dot 144, etc.) formed from the laser beam at least partially reflecting off the workpiece surface 110. Accordingly, the illuminated dot projected by the laser projector 142 indicates where the centerline axis 120 of the drilling tool 106 intersects the workpiece surface 110 when the alignment surface 130 of the cage 124 is engaged in physical contact with the workpiece surface 110.

The laser projector 142 is mounted to the cage 124 using any method, means, structure, mechanism, manner, arrangement, connection, connector, device, and/or the like that enables the laser projector 142 to function as described and/or illustrated herein (e.g., to project a laser beam that intersects the centerline axis 120 of the drilling tool 106, to project an illuminated dot onto the workpiece surface 110 that indicates where the centerline axis 120 of the drilling tool 106 intersects the workpiece surface 110, etc.). In some other implementations, the laser projector 142 additionally or alternatively is mounted to the body 114 of the drilling apparatus 102. Examples of methods, means, structure, mechanisms, manners, arrangements, connections, connectors, devices, and/or the like that are used in some implementations to mount the laser projector 142 to the cage 124 and/or the body 114 include, but are not limited to, an adhesive, an interference fit, a snap-fit, a fastener (e.g., a threaded fastener, etc.), a latch, welding, brazing, an epoxy, a clip, a ring, a cotter pin, a quick release pin, a clevis, a clevis-type connection, a bayonet-type connection, a spring override, and/or the like.

In some implementations, one or more parameters of the laser projector 142 is selectable, for example to enable calibration of the laser projector 142. In other words, one or more parameters of the laser projector 142 can be adjusted, changed, and/or the like (e.g., by a user, a technician, etc.) in some implementations, for example to configure the laser projector 142 such that the illuminated dot (e.g., the illuminated dot 144 shown in FIGS. 2 and 3, etc.) projected by the laser projector 142 indicates where the centerline axis 120 of the drilling tool 106 intersects the workpiece surface 110. In other words, in some implementations, one or more parameters of the laser projector 142 is adjustable, for example to configure the laser projector 142 such that the laser beam projected thereby is aimed to intersect the centerline axis 120 of the drilling tool 106 at a location that corresponds to the position of the particular workpiece surface 110 along the centerline axis 120. Examples of parameters of the laser projector 142 that are selected in some implementations include, but are not limited to, the orientation of the laser projector 142 relative to the centerline axis 120, the intensity of the laser beam projected by the laser projector 142, the position (e.g., location, orientation, angle, alignment, etc.) of the laser projector 142 on the cage 124 and/or the body 114, and/or the like.

One exemplary implementation of calibrating the laser projector 142 includes: (1) loosening one or more mounts (not shown) that mounts the laser projector 142 to the cage 124 and/or the body 114 of the drilling apparatus 102 such that the position of the laser projector 142 one the cage 124 and/or the body 114 can be adjusted; (2) engaging the alignment surface 130 of the cage 124 in physical contact with the workpiece surface 110 of a test workpiece 108; (3) mounting the cage 124 to the body 114 of the drilling apparatus 102; (4) drilling an indent into the test workpiece surface 110; (5) adjusting the position of the laser projector 142 relative to the cage 124 and/or the body 114 such that the illuminated dot 144 projected by the laser projector 142 is aligned (e.g., approximately precisely, etc.) with the indent; and (6) tightening the mount(s) that mounts the laser projector 142 to the cage 124 and/or the body 114 to secure the laser projector 142 in the calibrated position. Steps (1)-(3) of the above-described exemplary implementation of calibrating the laser projector 142 can be performed in any relative order.

The laser projector 142 is any type of laser projector 142 that enables the laser projector 142 to function as described and/or illustrated herein (e.g., to project a laser beam that intersects the centerline axis 120 of the drilling tool 106, to project an illuminated dot onto the workpiece surface 110 that indicates where the centerline axis 120 of the drilling tool 106 intersects the workpiece surface 110, etc.). Examples of the laser projector 142 include, but are not limited to, a laser diode (e.g., direct injection, etc.) type, a solid state diode-pumped, frequency-doubled (DPSS) type, a gas laser, and/or the like.

As described above, the drilling apparatus 102 is moved relative to the workpiece surface 110 to approximately align the illuminated dot, and thus the centerline axis 120 of the drilling tool 106, with the target drilling location 112 on the workpiece surface 110. Once the illuminated dot projected by the laser projector 142 is approximately aligned with the target drilling location 112, the drilling apparatus 102 is ready to perform a drilling operation into the workpiece 108 approximately at the target drilling location 112. Specifically, the drilling tool 106 is positioned (e.g., oriented, aligned, angled, located, etc.) with respect to the target drilling location 112 such that: (1) the centerline axis 120 of the drilling tool 106 is approximately aligned with the target drilling location 112; and (2) the centerline axis 120 extends approximately normal to the workpiece surface 110 (e.g., at the target drilling location 112, etc.). For example, in implementations wherein the target drilling location 112 is a location on a fastener (e.g., a rivet, a bolt, a screw, etc.) such as, but not limited to, the implementation of FIG. 1, the centerline axis 120 of the drilling tool 106 may be approximately aligned with an approximate center of the fastener (e.g., the approximate center 112a of the fastener 146 of the implementation shown in FIG. 1, etc.).

In some implementations, the illuminated dot projected by the laser projector 142 (e.g., the illuminated dot 144 shown in FIGS. 2 and 3, etc.) onto the workpiece surface 110 is visible to a user of the drilling apparatus 102. For example, the user of the drilling apparatus 102 has a line of sight with the illuminated dot in some implementations, wherein the line of sight exists: (1) while the user is positioning the drilling apparatus 102 on and/or along the workpiece surface 110; and/or (2) while the user is performing a drilling operation on the workpiece 108 (e.g., is drilling into the workpiece surface 110, etc.). In some implementations, the line of sight between the user and the illuminated dot projected by the laser projector 142 is a direct line of sight; while in other implementations the line of sight between the user and the illuminated dot projected by the laser projector 142 is an indirect line of sight provided by one or more mirrors, reflectors, and/or the like. The line of sight between the user and the illuminated dot projected by the laser projector 142 enables the user to locate and watch the illuminated dot in real-time as the user moves the drilling apparatus 102 to approximately align the illuminated dot, and thereby the centerline axis 120, with the target drilling location 112.

In addition or alternatively to providing the user with a line of sight to the illuminated dot projected by the laser projector 142, the positioning device 104 optionally includes one or more cameras 148 mounted to the cage 124. Each camera 148 is configured to acquire images of an area (e.g., the viewing area 150 shown in FIGS. 2 and 3, etc.) of the workpiece surface 110 that includes the illuminated dot (e.g., the illuminated dot 144 shown in FIGS. 2 and 3, etc.) when the alignment surface 130 of the cage 124 is in contact with the workpiece surface 110. For example, the camera 148 is configured such that when the alignment surface 130 of the cage 124 is engaged in physical contact with the workpiece surface 110 at a location wherein a target drilling location 112 is in view of the camera 148, the camera 148 acquires images of an area (e.g., the viewing area 150, etc.) that includes both the illuminated dot and the target drilling location 112. The images acquired by the camera 148 enable a user to locate and watch the illuminated dot (e.g., in real-time, etc.) as the user moves the drilling apparatus 102 to approximately align the illuminated dot, and thereby the centerline axis 120, with the target drilling location 112.

Each camera 148 is configured to acquire any type of images, such as, but not limited to, still images, video images, real-time images, delayed images, visible light images, night vision images, etc. For example, in one exemplary implementation, one or more cameras 148 is configured to acquire real-time video of the area that includes both the illuminated dot projected by the laser projector 142 and the target drilling location 112. Each camera 148 is any type of camera 148 that enables the camera 148 to function as described and/or illustrated herein (e.g., to acquire images of an area of the workpiece surface 110 that includes both the illuminated dot projected by the laser projector 142 and the target drilling location 112, etc.). Examples of the camera 148 include, but are not limited to, a still image camera, a video camera, a digital camera, a night vision camera, a visible light camera, a lipstick camera, and/or the like. Although shown has including only a single camera 148, in other implementations the positioning device 104 includes any other number of cameras 148.

In some other implementations, one or more cameras 148 additionally or alternatively is mounted to the body 114 of the drilling apparatus 102. Each camera 148 is mounted to the cage 124 and/or the body 114 at any position (e.g., location, orientation, alignment, angle, etc.) that enables the camera 148 to function as described and/or illustrated herein (e.g., to acquire images of an area of the workpiece surface 110 that includes both the illuminated dot projected by the laser projector 142 and the target drilling location 112, etc.). Moreover, each camera 148 is mounted to the cage 124 using any method, means, structure, mechanism, manner, arrangement, connection, connector, device, and/or the like that enables the camera 148 to function as described and/or illustrated herein (e.g., to acquire images of an area of the workpiece surface 110 that includes both the illuminated dot and the target drilling location 112, etc.) Examples of methods, means, structures, mechanisms, manners, arrangements, connections, connectors, devices, and/or the like that are used in some implementations to mount one or more of the cameras 148 to the cage 124 and/or the body 114 include, but are not limited to, an adhesive, an interference fit, a snap-fit, a fastener (e.g., a threaded fastener, etc.), a latch, welding, brazing, an epoxy, a clip, a ring, a cotter pin, a quick release pin, a clevis, a clevis-type connection, a bayonet-type connection, a spring override, being built into the cage 124 and/or the body 114, and/or the like.

In some implementations, one or more parameters of one or more of the cameras 148 is selectable, for example to enable calibration of the camera 148. In other words, one or more parameters of one or more of the cameras 148 can be adjusted, changed, and/or the like (e.g., by a user, a technician, etc.) in some implementations, for example to configure the camera 148 to acquire images of an area of the workpiece surface 110 (e.g., the viewing area 150, etc.) that includes both the target drilling location 112 and the illuminated dot (e.g., the illuminated dot 144, etc.) projected by the laser projector 142. Examples of parameters of one or more cameras 148 that are selected in some implementations include, but are not limited to, the position (e.g., location, orientation, alignment, angle, etc.) of the camera 148 on the cage 124 and/or the body 114, the speed of the camera 148, the type of images (e.g., still images, video images, real-time images, delayed images, visible light images, night vision images, etc.) acquired by the camera, a delay of images acquired by the camera 148, and/or the like.

In implementations that include one or more cameras 148, optionally each camera 148 is operatively connected to one or more optional displays 152 of the positioning system 104 and/or one or more external displays 154 (described below) such that the camera 148 is configured to send the images acquired thereby to the display(s) 152 and/or the display(s) 154 for viewing by the user of the drilling apparatus 102. For example, in some implementations the positioning device 104 includes one or more displays 152 (e.g., the implementation shown in FIG. 1, etc.). Each display 152 of the positioning device 104 is mounted to the cage 124 and/or the body 114 of the drilling device 102. Each display 152 is mounted to the cage 124 and/or the body 114 at any position (e.g., location, orientation, angle, alignment, etc.) and using any manner, arrangement, method, means, structure, mechanism, connection, connector, device, and/or the like that enables the display 152 to be visible to (e.g., viewable by, etc.) a user of the drilling apparatus 102. For example, in some implementations one or more displays 152 of the positioning device 104 is mounted to the cage 124 and/or the body 114 of the drilling apparatus 102 as an external attachment (e.g., as is shown in the implementation of FIG. 1, etc.), while in other implementations one or more displays 152 of the positioning device 104 is built into the cage 124 and/or the body 114.

In one exemplary implementation, the positioning device 104 includes a display 152 that is mounted to the cage 124 and/or the body 114 of the drilling apparatus 102 as an external attachment such that the position (e.g., location, orientation, angle, alignment, etc.) of the display 152 relative to the cage 124 and the body 114 is configured to be adjusted by the user of the drilling apparatus 102 (e.g., using a telescoping arm, an articulating arm, a bending arm, etc.). For example, in the implementation of FIG. 1, the positioning device 104 includes a display 152 that is mounted to the cage 124 as an external attachment via an arm 156 that is configured to bend to enable the user to adjust the position of the display 152. The arm 156 includes a bendable shape memory material such that the arm 156 retains the bent shape selected by the user and thereby the display 152 remains fixed in the position set by the user.

In another exemplary implementation, the positioning device 104 includes a display 152 that is mounted to the body 114 of the drilling apparatus 102 by being built into the body 114 along an end portion 157 of the body 114, for example such that a center of a viewing area (e.g., the viewing area 150 shown in FIGS. 2 and 3, etc.) of the display 152 is approximately aligned with the centerline axis 120 of the drilling tool 106. In still another exemplary implementation, the positioning device 104 includes a display 152 that is mounted to the cage 124 and/or the body 114 of the drilling apparatus 102 at a hinge (not shown) such that the display 152 can rotate (e.g., flip, etc.) between a closed position wherein the screen of the display 152 is not visible and an open position wherein the screen is visible.

Examples of methods, means, structures, mechanisms, manners, arrangements, connections, connectors, devices, and/or the like that are used in some implementations to mount one or more of the displays 152 to the cage 124 and/or the body 114 include, but are not limited to, an adhesive, an interference fit, a snap-fit, a fastener (e.g., a threaded fastener, etc.), a latch, welding, brazing, an epoxy, a clip, a ring, a cotter pin, a quick release pin, a clevis, a clevis-type connection, a bayonet-type connection, a spring override, being built into the cage 124 and/or the body 114, and/or the like.

Each display 152 of the positioning device 104 is operatively connected to the corresponding camera(s) 148 of the positioning device 104 using any wireless operative connection and/or any wired operative connection that enables (e.g., configures, etc.) the display 152 to receive and display images acquired by the corresponding camera(s) 148. Examples of wired operative connections that enable the display 152 to receive and display images acquired by the corresponding camera(s) 148 include, but are not limited to, one or more electrical cables, one or more electrical wires, one or more optical cables, a wired connection to a local area network (LAN), a wired connection to a wide area network (WAN), a wired connection to the Internet, and/or the like. Examples of wireless operative connections that enable the display 152 to receive and display images acquired by the corresponding camera(s) 148 include, but are not limited to, a Wi-Fi™ network, Bluetooth®, a wireless LAN (WLAN), a wireless WAN (WWAN), a wireless connection to the Internet, and/or the like.

Each display 152 of the positioning device 104 is any type of display that enables the display 152 to function as described and/or illustrated herein (e.g., to display images acquired by the corresponding camera 148, etc.), such as, but not limited to, a plasma display, a liquid crystal display (LCD), a light emitting diode (LED) display, a cathode ray tube (CRT) display, a projection display, an organic light-emitting diode (OLED) display, and/or the like. Although shown has including only a single display 152, in other implementations the positioning device 104 includes any other number of displays 152.

The display 152 of the positioning device 104 described above and illustrated in FIG. 1 is a dedicated display. In other words, the display 152 is dedicated to displaying images acquired by one or more of the cameras 148 of the positioning device 104. In addition or alternatively to the positioning device 104 including one or more displays 152, optionally one or more of the cameras 148 of the positioning device 104 is configured to be operatively connected to one or more external displays 154 that is not a component of the positioning device 104. In other words, in some implementations one or more of the cameras 148 is configured to be operatively connected to one or more external displays 154 that is not dedicated to merely displaying images acquired by the camera(s) 148 of the positioning device 104. Examples of the external display 154 include, but are not limited to, a television, a display panel, a computer monitor, a smartphone, a headset, a virtual reality headset, an augmented reality headset, virtual reality glasses, augmented reality glasses, Google Glass, a hand held screen, a tablet and/or other mobile device, and/or the like.

Each camera 148 of the positioning device 104 is operatively connected to one or more corresponding external displays 154 using any wireless operative connection and/or any wired operative connection that enables (e.g., configures, etc.) the display 154 to receive and display images acquired by the corresponding camera(s) 148. Examples of wired operative connections that enable the external display 154 to receive and display images acquired by the corresponding camera(s) 148 include, but are not limited to, one or more electrical cables, one or more electrical wires, one or more optical cables, a wired connection to a LAN, a wired connection to a WAN, a wired connection to the Internet, and/or the like. Examples of wireless operative connections that enable the external display 154 to receive and display images acquired by the corresponding camera(s) 148 include, but are not limited to, a Wi-Fi™ network, Bluetooth®, a WLAN, a WWAN, a wireless connection to the Internet, and/or the like.

Each external display 154 is any type of display that enables the external display 154 to function as described and/or illustrated herein (e.g., to display images acquired by the corresponding camera 148, etc.), such as, but not limited to, a plasma display, an LCD, an LED display, a CRT display, a projection display, an OLED display, and/or the like.

In some implementations, one or more of the cameras 148, one or more of the displays 152, and/or one or more of the displays 154 is configured such that one or more displays 152 and/or one or more displays 154 is configured to display a reticle (e.g., the crosshair 158 shown in FIGS. 2 and 3, etc.) that is approximately centered on the illuminated dot projected by the laser projector 142. The reticle provides a visual guide that may assist the user as the user moves the drilling apparatus 102 to approximately align the illuminated dot (e.g., the illuminated dot 144 shown in FIGS. 2 and 3, etc.) projected by the laser projector 142 with the target drilling location 112. Examples of reticles that are optionally displayed by one or more displays 152 and/or one or more displays 154 include, but are not limited to, a crosshair, a fine crosshair (e.g., the crosshair 158, etc.), a duplex crosshair, a German reticle, a mil-dot, a circle, and/or the like.

Optionally, the positioning device 104 includes one or more strain gauges 160 mounted to the cage 124 such that the strain gauge 160 is configured to measure a load exerted on the cage 124 by a contact force between the alignment surface 130 of the cage 124 and the workpiece surface 110. Specifically, each strain gauge 160 is configured to measure the load exerted on the cage 124 by the contact force between the alignment surface 130 and the workpiece surface 110 at the location of the strain gauge 160. Accordingly, the load measured by each strain gauge 130 indicates the amount of contact force that the alignment surface 130 of the cage 124 is applying to the workpiece surface 110 at the location of the strain gauge 160. In the implementation shown in FIG. 1, the positioning device 104 includes a strain gauge 160 mounted to the end portion 140 of each leg 138 of the cage 124 for measuring the contact force between the workpiece surface 110 and the alignment surface 130 of the corresponding leg 138. Each strain gauge 160 measures the load exerted on the cage 124 at the location of the strain gauge 160 in any units, such as, but not limited to, pounds (lbs.), kilograms (kgs.), and/or the like.

In some implementations, one or more of the cameras 148, one or more of the displays 152, and/or one or more of the displays 154 is configured such that one or more displays 152 and/or one or more displays 154 is configured to display the load measured (e.g., the measured loads 162 shown in FIGS. 2 and 3, etc.) by the strain gauge(s) 160. In implementations wherein the positioning device 104 includes more than one strain gauge 160, the display(s) 152 and/or the display(s) 154 may display the load measured by each strain gauge 160 individually (e.g., as is shown in the implementation shown in FIGS. 2 and 3, etc.) and/or may display an average of the measurements of two or more of the strain gauges 160.

Although three are shown in FIG. 1, the positioning device 104 includes any other number of the strain gauges 160 (e.g., a single strain gauge 160, two strain gauges 160, four or more strain gauges 160, etc.). Each strain gauge 160 is mounted to the cage 124 at any position (e.g., location, orientation, alignment, angle, etc.) and using any method, means, structure, mechanism, manner, arrangement, connection, connector, device, and/or the like that enables the strain gauge 160 to function as described and/or illustrated herein (e.g., to measure a load that indicates the amount of contact force that the alignment surface 130 of the cage 124 is applying to the workpiece surface 110 at the location of the strain gauge 160, etc.) Examples of methods, means, structures, mechanisms, manners, arrangements, connections, connectors, devices, and/or the like that are used in some implementations to mount one or more of the strain gauges 160 to the cage 124 include, but are not limited to, an adhesive, an interference fit, a snap-fit, a fastener (e.g., a threaded fastener, etc.), a latch, welding, brazing, an epoxy, a clip, a ring, a cotter pin, a quick release pin, a clevis, a clevis-type connection, a bayonet-type connection, a spring override, being built into the cage 124 and/or the body 114, and/or the like.

In some implementations, the cage 124 is collapsible along the length thereof to guide movement of the drilling tool 106 along the centerline axis 120 toward the workpiece surface 110 during operation of the drilling apparatus 102. For example, the cage 124 is collapsible along the length thereof (e.g., along the axes 118 and 120, etc.) in implementations wherein the body 114 of the drilling apparatus 102 is moved along the axes 118 and 120 relative to the workpiece surface 110 to thereby move the drilling tool 106 toward and through the workpiece surface 110 during a drilling operation. In the implementation of FIG. 1, the cage 124 is configured to collapse along the axes 118 and 120 to enable the drilling apparatus 102, and thereby the drilling tool 106, to move in the direction of the arrow 122 toward and through the workpiece surface 110. Specifically, each leg 138 is collapsible in the direction of the arrow 164.

Any method, means, mechanism, structures, manners, arrangement, device, and/or the like is used to enable the cage 124 to collapse along the length thereof, such as, but not limited to, a telescoping arrangement, a sliding arrangement, a channel, a damper, a spring, and/or the like. For example, each of the legs 138 includes a telescoping structure wherein one or more segments of the length of the leg 138 is received into one or more other segments of the length of the leg 138 such that the leg 138 is collapsible from an extended position (shown in FIG. 1) to a retracted position (not shown). When a sufficient contact force is provided by engaging the cage 124 in physical contact with the workpiece surface 110, the legs 138 are forced from the extended positions toward the retracted positions to thereby collapse the cage 124 along the axes 118 and 120 in the direction of the arrow 164 into a collapsed position thereof. Optionally, one or more of the legs 138 includes a damper (not shown) that is operatively connected to the leg 138 to dampen the collapsing movement of the leg 138 along the axes 118 and 120 (e.g., to dampen the relative movement between two or more segments of the length of the leg 138 as the leg 138 collapses, etc.).

In some implementations, the cage 124 is resiliently collapsible along the length thereof using any type of biasing mechanism, such as, but not limited to, a mechanical spring, a gas spring, and/or the like. For example, each leg 138 of the cage 124 includes a biasing mechanism (not shown; e.g., the spring 268 shown in FIGS. 6 and 7, etc.) operatively connected to two or more segments of the length of the leg 138 such that the leg is biased in the direction of the arrow 122 toward an extended position of the leg 138. Each leg 138 collapses in the direction of the arrow 122 from the extended position shown in FIG. 1 to the retracted position against the biasing force provided by the biasing mechanism in the direction of the arrow 122. When the contact force is reduced and eventually removed as the cage 124 is disengaged from the workpiece surface 110, the biasing force provided by the biasing mechanism moves each corresponding leg 138 from the retracted position to the extended position to thereby extend the cage 124 in the direction of the arrow 122 from the collapsed position to the extended position shown in FIG. 1. In some other implementations, the cage 124 is not resiliently collapsible along the length thereof such that the cage 124 is manually extended from the collapsed position to the extended position by the user.

In some implementations of FIG. 1, the biasing mechanism of each leg 138 is a mechanical spring, for example a helical spring, etc. The biasing mechanism of each leg 138 is not limited to helical springs. Rather, the biasing mechanism of one or more of the legs 138 additionally or alternatively includes another type of mechanical spring in some implementations, such as, but not limited to, a flat spring, a machined spring, a serpentine spring, a torsion spring, a tension spring, a constant spring, a variable spring, a variable stiffness spring, a leaf spring, a cantilever spring, a volute spring, a v-spring, a puck, and/or the like. Moreover, the biasing mechanism of each leg is not limited to mechanical springs, but rather the biasing mechanism of one or more of the legs 138 additionally or alternatively includes another type of spring in some implementations, for example a gas spring, etc.

In operation, the cage 124 is engaged in physical contact with the workpiece surface 110 over or adjacent to the target drilling location 112 such that the alignment surface 130 of the cage 124 is engaged in physical contact with the workpiece surface 110. The contact between the alignment surface 130 and the workpiece surface 110 orients the drilling tool 106 relative to the workpiece surface 110 such that the centerline axis 120 extends approximately normal to the workpiece surface 110 (e.g., at the target drilling location 112, etc.). Using a direct and/or indirect line of sight and/or using one or more images acquired by the camera(s) 148, the user then moves the drilling apparatus 102 relative to the workpiece surface 110 to approximately align the illuminated dot (e.g., the illuminated dot 144 shown in FIGS. 2 and 3, etc.) projected by the laser projector 142, and thus the centerline axis 120 of the drilling tool 106, with the target drilling location 112 on the workpiece surface 110.

For example, FIGS. 2 and 3 illustrate an implementation of a viewing area 150 of the display(s) 152 (and/or of the display(s) 154) that includes both the target drilling location 112 and an illuminated dot 144 projected by the laser projector 142 (shown in FIG. 1). As shown in FIG. 2, the illuminated dot 144 is not aligned with the target drilling location 112, which in the exemplary implementation is the approximate center 112a of the fastener 146. FIG. 3 illustrates the viewing area 150 after the user has moved the drilling apparatus 102 relative to the workpiece surface 110 of the workpiece 108 such that the illuminated dot 144, and thus the centerline axis 120 of the drilling tool 106, is approximately aligned with the approximate center 112a of the fastener 146. As shown in FIGS. 2 and 3, the viewing area 150 includes a crosshair 158 displayed within the viewing area 150. The crosshair 158 is approximately centered on the illuminated dot 144 such that the crosshair 158 provides a visual guide that may assist the user in approximately aligning the illuminated dot 144 with the approximate center 112a of the fastener 146. As is also shown in FIGS. 2 and 3, measured loads 162 measured by the strain gauges 160 (shown in FIG. 1) are displayed within the viewing area 150, for example to indicate to the user if sufficient contact force is being exerted to collapse the cage 124, etc.

Referring again to FIG. 1, once the illuminated dot (e.g., the illuminated dot 144, etc.) projected by the laser projector 142 is approximately aligned with the target drilling location 112, the drilling apparatus 102 is ready to drill into the workpiece surface 110 approximately at the target drilling location 112. Because the centerline axis 120 of the drilling tool 106 both extends approximately normal to the workpiece surface 110 and is approximately aligned with the target drilling location 112, the positioning device 104 may reduce damage caused to the workpiece 108 and/or other structures (e.g., attaching substructure, etc.) resulting from the drilling operation. For example, the positioning device 104 may reduce the occurrence of oversized, misshapen (e.g., disfigured, etc.), and/or non-normal holes. Moreover, and for example, the positioning device 104 may reduce the number of broken drilling tools 106 resulting from repeated drilling operations. Furthermore, and for example, the positioning device 104 may reduce the cost of performing drilling operations, reduce the time-required to perform drilling operations, and/or reduce the labor required to perform drilling operations.

The cage 124 of the positioning device 104 can be configured to be mounted on any type of drilling apparatus 102 to thereby install the positioning device 104 on any type of drilling apparatus 102. For example, the cage 124 can be configured such that the positioning device 104 is capable of being installed on a portable hand-held drilling apparatus, a drill press, a drilling apparatus that is supported by a fixture and/or other structure, a less-portable drilling apparatus, a corded electrical drilling apparatus, a battery powered electric drilling apparatus, a pneumatic powered drilling apparatus, a hydraulic powered drilling apparatus, and/or the like. In some implementations, the cage 124 has a universal mounting configuration such that the positioning device 104 is capable of being installed on more than one type and/or brand of the drilling apparatus 102. In other implementations, the cage 124 has a mounting configuration that is dedicated to a single type and/or brand of the drilling apparatus 102. It should be understood from the above description that the positioning device 104 can be used to retrofit existing drilling apparatus 102 and/or can be provided as a component, attachment, and/or the like of a new drilling apparatus 102.

FIGS. 4-7 illustrate an example of an implementation of a positioning device 204 wherein a cage 224 of the positioning device 204 is collapsible along the length thereof. The positioning device 204 is configured to facilitate positioning a drilling tool 206 of a drilling apparatus 202 relative to a workpiece (e.g., the workpiece 108 shown in FIGS. 1-3, etc.). Specifically, the positioning device 204 includes the cage 224, which extends a length from an end portion 226 to an opposite end portion 228 (not visible in FIGS. 6 and 7). The end portion 226 of the cage 224 is configured to be mounted to the body (not shown, e.g., the body 114 shown in FIG. 1, etc.) of the drilling apparatus 202 such that the cage at least partially surrounds the circumference of the drilling tool 206 of the drilling apparatus 202, as shown in FIGS. 4-7. As illustrated in FIGS. 4-7, the length of the cage 224 extends along an axis of rotation 218 and a centerline axis 220 of the drilling tool 206 when the cage 224 is mounted to the drilling apparatus 202. The end portion 228 of the cage 224 includes an alignment surface 230 (not visible in FIGS. 6 and 7) that is configured to be engaged in physical contact with a workpiece surface (e.g., the workpiece surface 110 shown in FIGS. 1-3, etc.) of the workpiece such that the centerline axis 220 of the drilling tool 206 extends (e.g., is oriented, etc.) approximately normal to the workpiece surface.

The positioning device 204 is configured to facilitate positioning the drilling apparatus 202 such that the drilling tool 206 is aligned with a target drilling location (e.g., the target drilling location 112 shown in FIGS. 1-3, etc.) on the workpiece surface. For example, the positioning device 204 includes a laser projector 242 (not visible in FIGS. 6 and 7) mounted to the cage 224 such that the laser projector 242 is configured to project an illuminated dot (e.g., the illuminated dot 144 shown in FIGS. 2 and 3, etc.) onto the workpiece surface. The illuminated dot projected by the laser projector 242 indicates where the centerline axis 220 of the drilling tool 206 intersects the workpiece surface when the alignment surface 230 of the cage 224 is in contact with the workpiece surface. Optionally, the illuminated dot projected by the laser projector 242 onto the workpiece surface is visible to a user of the drilling apparatus 202 (e.g., the user of the drilling apparatus 202 has a direct and/or indirect line of sight with the illuminated dot, etc.).

The positioning device 204 optionally includes one or more cameras 248 (not visible in FIGS. 6 and 7) configured to acquire images of an area (e.g., the viewing area 150 shown in FIGS. 2 and 3, etc.) of the workpiece surface that includes the illuminated dot when the alignment surface 230 of the cage 224 is in contact with the workpiece surface. For example, the camera 248 is configured such that when the alignment surface 230 of the cage 224 is engaged in physical contact with the workpiece surface at a location wherein a target drilling location is in view of the camera 248, the camera 248 acquires images of an area (e.g., the viewing area 150, etc.) that includes both the illuminated dot and the target drilling location. Optionally, each camera 248 of the positioning device is operatively connected to one or more optional displays (e.g., the display 152 shown in FIG. 1, etc.) of the positioning system 204 and/or one or more external displays (e.g., the display 154 shown in FIG. 1, etc.) such that the camera 248 is configured to send the images acquired thereby to the display(s) for viewing by the user of the drilling apparatus 202.

The positioning device 204 optionally includes one or more strain gauges 260 (not visible in FIGS. 6 and 7) mounted to the cage 224 such that the strain gauge 260 is configured to measure a load exerted on the cage 224 by a contact force between the alignment surface 230 of the cage 224 and the workpiece surface. The load measured by each strain gauge 260 indicates the amount of contact force that the alignment surface 230 of the cage 224 is applying to the workpiece surface at the location of the strain gauge 260.

As briefly described above, the cage 224 is collapsible along the length thereof to guide movement of the drilling tool 206 along the centerline axis 220 toward the workpiece surface during operation of the drilling apparatus 202. FIGS. 4-7 thus illustrate an implementation for use with a drilling apparatus 202 wherein the drilling tool 206 is moved toward and through the workpiece surface during a drilling operation by moving the body of the drilling apparatus 202 along the axes 218 and 220 relative to the workpiece surface.

In the exemplary implementation of FIGS. 4-7, the end portion 226 of the cage 224 includes a base 266 that is configured to collapse along the length thereof (e.g., along the axes 218 and 220, etc.) in the direction of the arrow 264 from an extended position (e.g., the extended position shown in FIG. 4, etc.) to a collapsed position (e.g., the collapsed position shown in FIG. 5, etc.). Any method, means, mechanism, structures, manners, arrangement, device, and/or the like is used to enable the cage 224 to collapse along the length thereof, such as, but not limited to, a telescoping arrangement, a sliding arrangement, a channel, a damper, a spring, and/or the like. For example, in the exemplary implementation of FIGS. 4-7, the base 266 includes a telescoping structure wherein a segment 266a of the length of the base 266 is received into another segment 266b of the length of the base 266 such that the base 266 is collapsible in the direction of the arrow 164 from the extended position to the collapsed position, as is best seen in FIGS. 6 and 7.

Referring now solely to FIGS. 6 and 7, the cage 224 is resiliently collapsible along the length thereof in the exemplary implementation of the cage 224. Although the cage 224 additionally or alternatively may include any other type of biasing mechanism, in the exemplary implementation the cage 224 includes a helical spring 268 operatively connected between the segments 266a and 266b such that the base 266 is biased in the direction of the arrow 222 toward an extended position of the segment 266a (e.g., the extended position shown in FIG. 6, etc.) that corresponds with the extended position of the base 266. When a sufficient contact force is provided by engaging the cage 224 in physical contact with the workpiece surface, the segment 266a collapses along the axes 218 and 220 in the direction 222 (against the biasing force provided by the helical spring 268 in the direction 222) from the extended position to a retracted position of the segment 266a (e.g., the retracted position shown in FIG. 7) that corresponds to the collapsed position of the base 266. When the contact force is reduced and eventually removed as the cage 224 is disengaged from the workpiece surface, the biasing force provided by the helical spring 268 moves the segment 266a from the retracted position to the extended position to thereby extend the cage 224 in the direction 222 from the collapsed position to the extended position thereof. In some other implementations, the cage 224 is not resiliently collapsible along the length thereof such that the cage 224 is manually extended from the collapsed position to the extended position by the user.

Optionally, the amount of movement of the segment 266a along the axes 218 and 220 between the extended and retracted positions is adjustable such that the distance that the cage 224 collapses along the axes 218 and 220 (e.g., the amount of travel between the extended and collapsed and positions of the cage 224, etc.) is selectable. Although any other structure additionally or alternatively can be used, in the exemplary implementation two subsegments 266aa and 266ab of the segment 266a are threadedly connected such that the relative position therebetween is selectable to enable the amount of travel between the extended and collapsed positions of the cage 224 to be selectively increased and decreased. For example, the position of a stop 270 that limits the amount of travel of the cage 224 from the extended position to the collapsed position can be selectively adjusted via the threaded connection between the subsegments 266*aa* and 266*ab* of the segment 266*a*.

Figure 9:
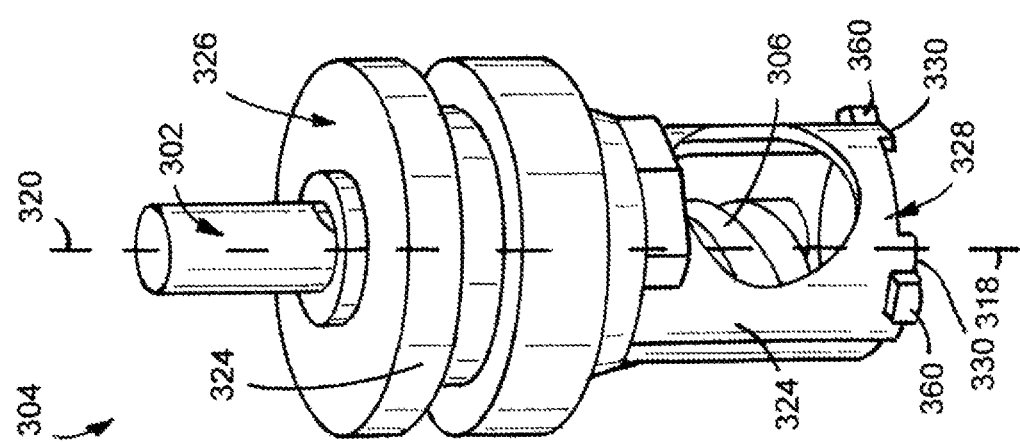
FIG. 9 is another perspective view of the positioning device shown in FIG. 8.
Figure 8:
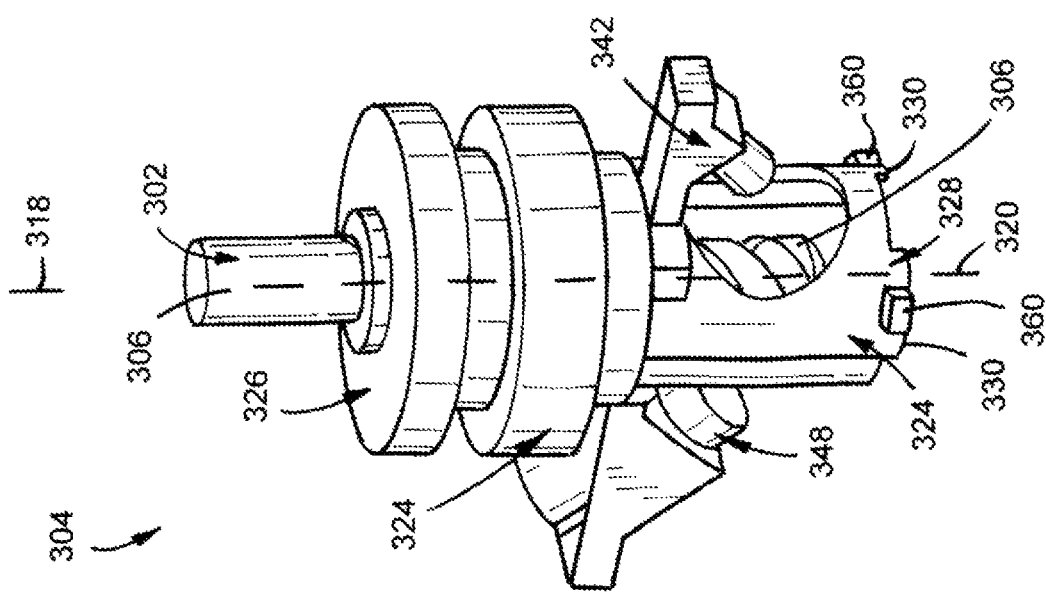
FIG. 8 is a perspective view of a positioning device according to an implementation wherein the positioning device is not collapsible along the length thereof.

FIGS. 8-10 illustrate an example of an implementation of a positioning device 304 wherein a cage 324 of the positioning device 304 is rigid along the length thereof such that the cage 324 is not collapsible along the length thereof. The positioning device 304 is configured to facilitate positioning a drilling tool 306 of a drilling apparatus 302 relative to a workpiece (e.g., the workpiece 108 shown in FIGS. 1-3, etc.). Specifically, the positioning device 304 includes the cage 324, which extends a length from an end portion 326 (not visible in FIG. 10) to an opposite end portion 328. The end portion 326 of the cage 324 is configured to be mounted to the body (not shown, e.g., the body 114 shown in FIG. 1, etc.) of the drilling apparatus 302 such that the cage at least partially surrounds the circumference of the drilling tool 306 of the drilling apparatus 302, as shown in FIGS. 8-10. As illustrated in FIGS. 8-10, the length of the cage 324 extends along an axis of rotation 318 and a centerline axis 320 of the drilling tool 306 when the cage 324 is mounted to the drilling apparatus 302. The end portion 328 of the cage 324 includes an alignment surface 330 that is configured to be engaged in physical contact with a workpiece surface (e.g., the workpiece surface 110 shown in FIGS. 1-3, etc.) of the workpiece such that the centerline axis 320 of the drilling tool 306 extends (e.g., is oriented, etc.) approximately normal to the workpiece surface.

The positioning device 304 is configured to facilitate positioning the drilling apparatus 302 such that the drilling tool 306 is aligned with a target drilling location (e.g., the target drilling location 112 shown in FIGS. 1-3, etc.) on the workpiece surface. For example, the positioning device 304 includes a laser projector 342 (not shown in FIGS. 9 and 10) mounted to the cage 324 such that the laser projector 342 is configured to project an illuminated dot (e.g., the illuminated dot 144 shown in FIGS. 2 and 3, etc.) onto the workpiece surface. The illuminated dot projected by the laser projector 342 indicates where the centerline axis 320 of the drilling tool 306 intersects the workpiece surface when the alignment surface 330 of the cage 324 is in contact with the workpiece surface. Optionally, the illuminated dot projected by the laser projector 342 onto the workpiece surface is visible to a user of the drilling apparatus 302 (e.g., the user of the drilling apparatus 302 has a direct and/or indirect line of sight with the illuminated dot, etc.).

The positioning device 304 optionally includes one or more cameras 348 (not shown in FIGS. 9 and 10) configured to acquire images of an area (e.g., the viewing area 150 shown in FIGS. 2 and 3, etc.) of the workpiece surface that includes the illuminated dot when the alignment surface 330 of the cage 324 is in contact with the workpiece surface. For example, the camera 348 is configured such that when the alignment surface 330 of the cage 324 is engaged in physical contact with the workpiece surface at a location wherein a target drilling location is in view of the camera 348, the camera 348 acquires images of an area (e.g., the viewing area 150, etc.) that includes both the illuminated dot and the target drilling location. Optionally, each camera 348 of the positioning device is operatively connected to one or more optional displays (e.g., the display 152 shown in FIG. 1, etc.) of the positioning system 304 and/or one or more external displays (e.g., the display 154 shown in FIG. 1, etc.) such that the camera 348 is configured to send the images acquired thereby to the display(s) for viewing by the user of the drilling apparatus 302.

The positioning device 304 optionally includes one or more strain gauges 360 mounted to the cage 324 such that the strain gauge 360 is configured to measure a load exerted on the cage 324 by a contact force between the alignment surface 330 of the cage 324 and the workpiece surface. The load measured by each strain gauge 360 indicates the amount of contact force that the alignment surface 330 of the cage 324 is applying to the workpiece surface at the location of the strain gauge 360.

As briefly described above, the cage 324 of the positioning device 304 is rigid along the length thereof such that the cage 324 does not collapse along the length thereof (e.g., along the axes 318 and 320, etc.) during operation of the drilling apparatus 302. FIGS. 8-10 thus illustrate an implementation for use with a drilling apparatus 302 wherein the drilling tool 306 moves relative to the body of the drilling apparatus 302 to move the drilling tool 306 along the axes 318 and 320 toward and through the workpiece surface.

Figure 11:
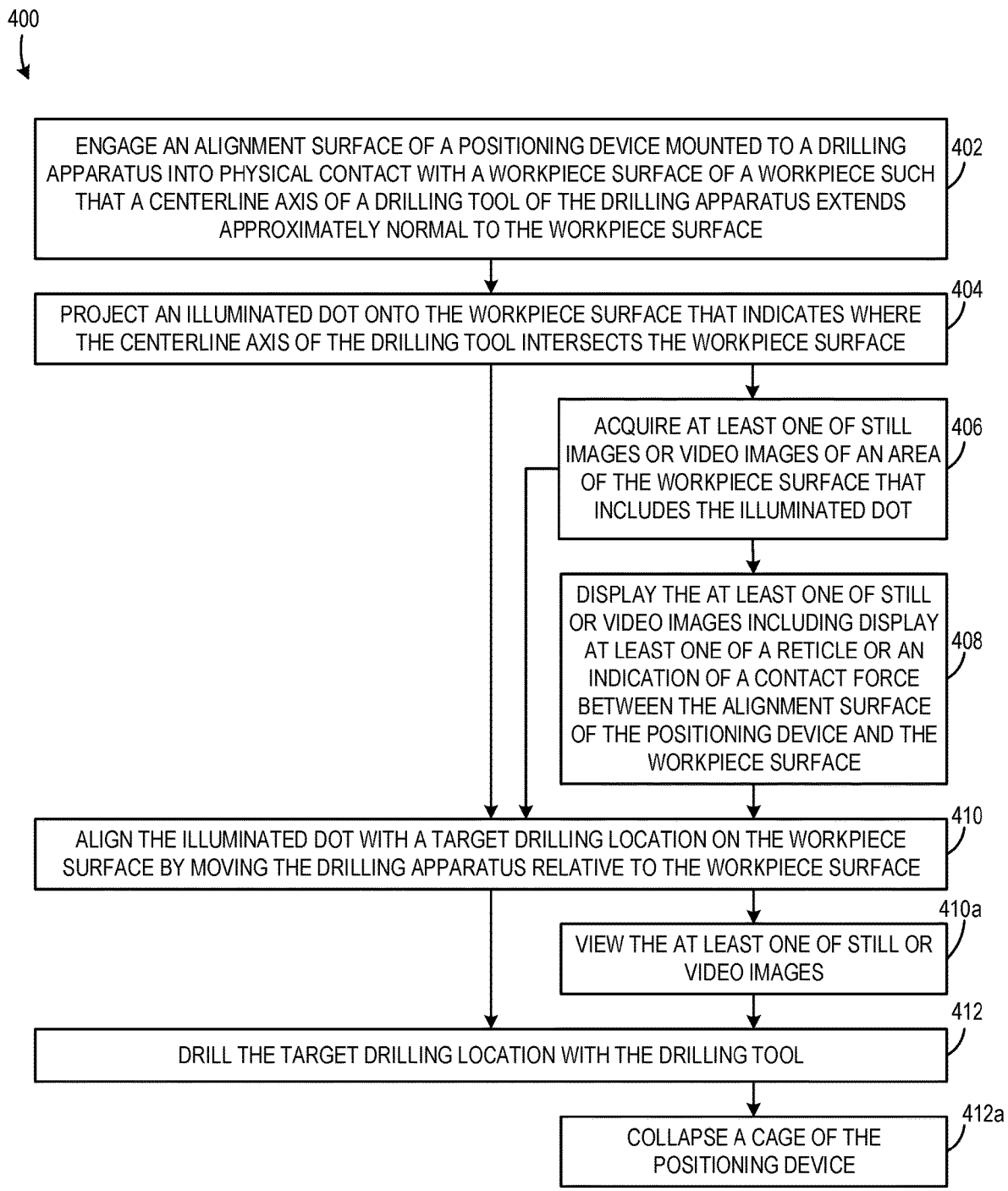
FIG. 11 is a flow chart illustrating a method for drilling a workpiece according to an implementation.

FIG. 11 is a flow chart illustrating a method 400 for drilling a workpiece according to an implementation. The method 400 includes engaging, at 402, an alignment surface of a positioning device mounted to a drilling apparatus into physical contact with a workpiece surface of the workpiece such that a centerline axis of a drilling tool of the drilling apparatus extends approximately normal to the workpiece surface. In some implementations, engaging at 402 includes engaging the alignment surface into physical contact with the workpiece surface such that the centerline axis of the drilling tool extends precisely normal to the workpiece surface. At 404, the method 400 includes projecting an illuminated dot onto the workpiece surface that indicates where the centerline axis of the drilling tool intersects the workpiece surface.

Optionally, the method 400 includes acquiring, at 406, at least one of still images or video images of an area of the workpiece surface that includes the illuminated dot. The method 400 also optionally includes displaying, at 408, the at least one of still or video images including displaying at least one of a reticle or an indication of a contact force between the alignment surface of the positioning device and the workpiece surface.

The method further includes aligning, at 410, the illuminated dot with a target drilling location on the workpiece surface by moving the drilling apparatus relative to the workpiece surface. In some implementations, aligning at 410 the illuminated dot with the target drilling location includes approximately aligning at 410 the illuminated dot with the target drilling location. In some implementations, aligning at 410 the illuminated dot with the target drilling location includes precisely aligning at 410 the illuminated dot with the target drilling location. In some implementations, aligning at 410 the illuminated dot with the target drilling location includes adjustably aligning at 410 the illuminated dot with the target drilling location. In some implementations, aligning at 410 the illuminated dot with the target drilling location includes viewing, at 410*a*, the at least one of still or video images optionally acquired at the optional step 406 of the method 400.

At 412, the method 400 includes drilling the target drilling location with the drilling tool. In some implementations, drilling at 412 the target drilling location with the drilling tool includes collapsing, at 412*a* a cage of the positioning device.

Figure 12:
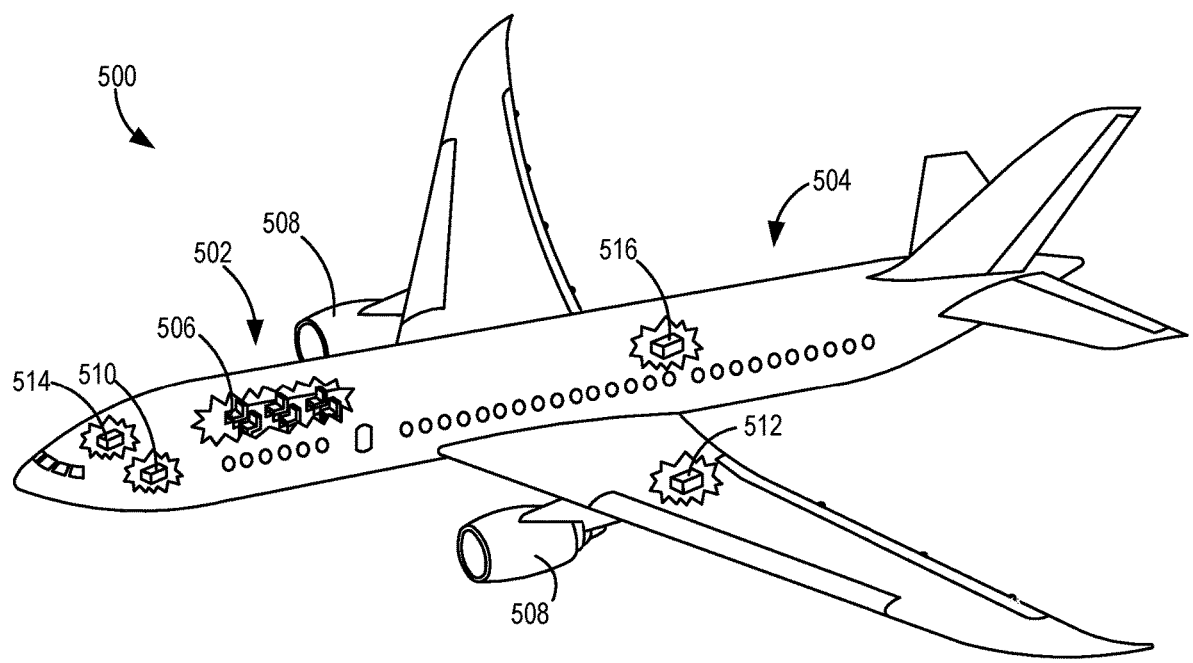
FIG. 12 is a schematic view of an implementation of an aircraft.

Referring now to FIG. 12, examples of the disclosure may be described in the context of using the positioning device to build one or more portions of an aircraft 500 that includes an airframe 502 with a plurality of high-level systems 504 and an interior 506. Examples of high-level systems 504 include one or more of a propulsion system 508, an electrical system 510, a hydraulic fluid system 512, a control system 514, and an environmental system 516. Any number of other systems can be included. Although an aerospace example is shown, the principles can be applied to other industries, such as, but not limited to, the automotive industry, the marine industry, and/or the like.

Figure 13:
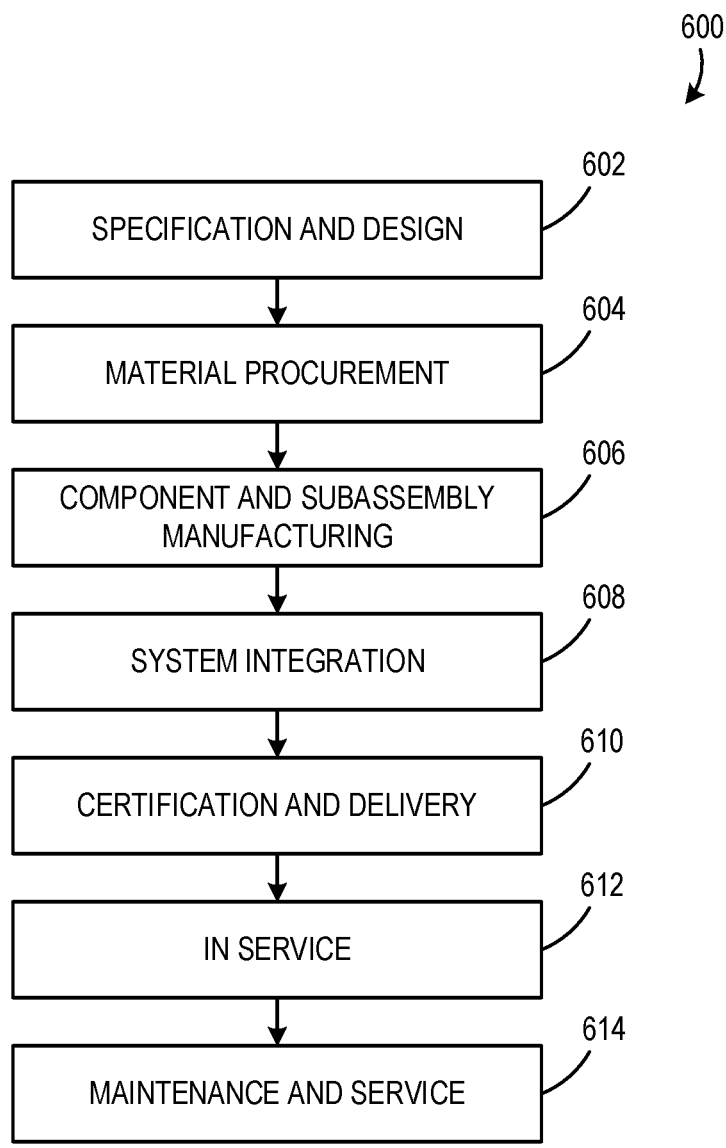
FIG. 13 is a block diagram of an implementation of an aircraft production and service methodology.

Examples of the disclosure can be described in the context of an aircraft manufacturing and service method 600 as shown in FIG. 13. During pre-production, illustrative method 600 can include specification and design 602 of an aircraft (e.g., aircraft 500 shown in FIG. 12, etc.) and material procurement 604. During production, component and subassembly manufacturing 606 and system integration 608 of the aircraft take place. Thereafter, the aircraft can go through certification and delivery 610 to be placed in service 612. While in service by a customer, the aircraft is scheduled for routine maintenance and service 614 (which can also include modification, reconfiguration, refurbishment, and so on).

Each of the processes of the illustrative method 600 can be performed or carried out by a system integrator, a third party, and/or an operator (e.g., a customer, etc.). For the purposes of this description, a system integrator can include, without limitation, any number of aircraft manufacturers and major-system subcontractors; a third party can include, without limitation, any number of vendors, subcontractors, and suppliers; and an operator can be an airline, leasing company, military entity, service organization, and so on.

It should be noted that any number of other systems can be included with the system described herein. Also, although an aerospace example is shown, the principles can be applied to other industries, such as, but not limited to, the automotive industry, the marine industry, and/or the like.

Systems and methods shown or described herein can be employed during any one or more of the stages of the manufacturing and service method 600. For example, components or subassemblies corresponding to component and subassembly manufacturing 606 can be fabricated or manufactured in a manner similar to components or subassemblies produced while the aircraft is in service. Also, one or more aspects of the system, method, or combination thereof can be utilized during the production states of subassembly manufacturing 606 and system integration 608, for example, by substantially expediting assembly of or reducing the cost of the aircraft. Similarly, one or more aspects of the apparatus or method realizations, or a combination thereof, cab be utilized, for example and without limitation, while the aircraft is in service, e.g., maintenance and service 614.

Various implementations of the present disclosure facilitate positioning a drilling tool of a drilling apparatus both normal to a workpiece surface and aligned with a target drilling location on the workpiece surface. Various implementations of the present disclosure reduce damage caused to the workpiece and/or other structures (e.g., attaching substructure, etc.) resulting from drilling operations. For example, various implementations of the present disclosure reduce the occurrence of oversized, misshapen (e.g., disfigured, etc.), and/or non-normal holes. Various implementations of the present disclosure reduce the number of broken drilling tools resulting from repeated drilling operations. Various implementations of the present disclosure reduce the cost of performing drilling operations, reduce the time-required to perform drilling operations, and/or reduce the labor required to perform drilling operations.

The following clauses describe further aspects:

Clause Set A:

A1. A positioning device for positioning a drilling tool of a drilling apparatus relative to a workpiece, the positioning device comprising:

a cage configured to be mounted to the drilling apparatus such that the cage at least partially surrounds the drilling tool of the drilling apparatus, the cage comprising an end portion that includes an alignment surface that is configured to be engaged in physical contact with a workpiece surface of the workpiece, the alignment surface of the cage being oriented relative to a centerline axis of the drilling tool when the cage is mounted to the drilling apparatus such that the centerline axis extends approximately normal to the workpiece surface when the alignment surface of the cage is in contact with the workpiece surface; and a laser projector mounted to the cage such that the laser projector is configured to project an illuminated dot onto the workpiece surface that indicates where the centerline axis of the drilling tool intersects the workpiece surface when the alignment surface of the cage is in contact with the workpiece surface.

A2. The positioning device of clause A1, wherein the illuminated dot projected by the laser projector onto the workpiece surface is adjustably aligned with a target drilling location on the workpiece surface by moving the drilling apparatus relative to the workpiece surface.

A3. The positioning device of clause A1, further comprising a camera mounted to at least one of the cage or the drilling apparatus such that the camera is configured to acquire at least one of still images or video images of an area of the workpiece surface that includes the illuminated dot when the alignment surface of the cage is in contact with the workpiece surface.

A4. The positioning device of clause A1, further comprising a camera mounted to at least one of the cage or the drilling apparatus such that the camera is configured to acquire at least one of still images or video images of an area of the workpiece surface that includes the illuminated dot when the alignment surface of the cage is in contact with the workpiece surface, wherein the positioning device further comprises a display mounted to at least one of the cage or the drilling apparatus, the display being operatively connected to the camera for displaying the at least one of still or video images acquired by the camera.

A5. The positioning device of clause A1, further comprising a camera mounted to at least one of the cage or the drilling apparatus such that the camera is configured to acquire at least one of still images or video images of an area of the workpiece surface that includes the illuminated dot when the alignment surface of the cage is in contact with the workpiece surface, wherein the positioning device further comprises a display operatively connected to the camera for displaying the at least one of still or video images acquired by the camera, the display being configured to display a reticle that is approximately centered on the illuminated dot projected by the laser projector.

A6. The positioning device of clause A1, wherein the cage extends a length that extends along the centerline axis of the drilling tool when the cage is mounted to the drilling apparatus, the cage being rigid along the length thereof such that the drilling tool moves along the length of the cage toward the workpiece surface during operation of the drilling apparatus.

A7. The positioning device of clause A1, wherein the cage extends a length that extends along the centerline axis of the drilling tool when the cage is mounted to the drilling apparatus, the cage being collapsible along the length thereof to guide movement of the drilling tool along the centerline axis toward the workpiece surface during operation of the drilling apparatus.

A8. The positioning device of clause A1, wherein the cage extends a length that extends along the centerline axis of the drilling tool when the cage is mounted to the drilling apparatus, the cage being resiliently collapsible along the length thereof to guide movement of the drilling tool along the centerline axis toward the workpiece surface during operation of the drilling apparatus.

A9. The positioning device of clause A1, further comprising at least one strain gauge mounted to the cage and configured to measure a load exerted on the cage by a contact force between the alignment surface of the cage and the workpiece surface.

A10. The positioning device of clause A1, wherein the cage comprises at least two legs, the end portion of the cage being defined by end portions of the at least two legs, the alignment surface of the end portion of the cage being defined by end surfaces of the legs.

A11. The positioning device of clause A1, wherein the drilling apparatus comprises a hand-held drilling apparatus and the cage is configured to be mounted to the hand-held drilling apparatus.

Clause Set B:

B1. A drilling apparatus assembly comprising:
a drilling apparatus comprising:
a body;
a chuck held by the body; and
a drilling tool held by the chuck; and
a positioning device mounted to the drilling apparatus for positioning the drilling tool relative to a workpiece, the positioning device comprising:
  a cage at least partially surrounding the drilling tool of the drilling apparatus, the cage comprising an end portion that includes an alignment surface that is configured to be engaged in physical contact with a workpiece surface of the workpiece, the alignment surface of the cage being oriented relative to a centerline axis of the drilling tool such that the centerline axis extends approximately normal to the workpiece surface when the alignment surface of the cage is in contact with the workpiece surface; and
  a laser projector mounted to the cage such that the laser projector is configured to project an illuminated dot onto the workpiece surface that indicates where the centerline axis of the drilling tool intersects the workpiece surface when the alignment surface of the cage is in contact with the workpiece surface, wherein the illuminated dot projected by the laser projector onto the workpiece surface is adjustably aligned with a target drilling location on the workpiece surface by moving the drilling apparatus relative to the workpiece surface.

B2. The drilling apparatus assembly of clause B1, wherein the positioning device further comprises a camera mounted to at least one of the cage or the body such that the camera is configured to acquire at least one of still images or video images of an area of the workpiece surface that includes the illuminated dot when the alignment surface of the cage is in contact with the workpiece surface.

B3. The drilling apparatus assembly of clause B1, wherein the positioning device further comprises a camera mounted to at least one of the cage or the body such that the camera is configured to acquire at least one of still images or video images of an area of the workpiece surface that includes the illuminated dot when the alignment surface of the cage is in contact with the workpiece surface, wherein the positioning device further comprises a display mounted to at least one of the cage or the body, the display being operatively connected to the camera for displaying the at least one of still or video images acquired by the camera.

B4. The drilling apparatus assembly of clause B1, wherein the cage of the positioning device extends a length that extends along the centerline axis of the drilling tool, the cage being collapsible along the length thereof to guide movement of the drilling tool along the centerline axis toward the workpiece surface during operation of the drilling apparatus.

B5. The drilling apparatus assembly of clause B1, wherein the positioning device further comprises at least one strain gauge mounted to the cage and configured to measure a load exerted on the cage by a contact force between the alignment surface of the cage and the workpiece surface.

Clause Set C:

C1. A method for drilling a workpiece, the method comprising:
engaging an alignment surface of a positioning device mounted to a drilling apparatus into physical contact with a workpiece surface of the workpiece such that a centerline axis of a drilling tool of the drilling apparatus extends approximately normal to the workpiece surface;
projecting an illuminated dot onto the workpiece surface that indicates where the centerline axis of the drilling tool intersects the workpiece surface;
aligning the illuminated dot with a target drilling location on the workpiece surface by moving the drilling apparatus relative to the workpiece surface; and
drilling the target drilling location with the drilling tool.

C2. The method of clause C1, further comprising acquiring at least one of still images or video images of an area of the workpiece surface that includes the illuminated dot, and wherein aligning the illuminated dot with the target drilling location comprises viewing the at least one of still or video images.

C3. The method of clause C1, wherein drilling the target drilling location with the drilling tool comprises collapsing a cage of the positioning device.

C4. The method of clause C1, further comprising;
acquiring at least one of still images or video images of an area of the workpiece surface that includes the illuminated dot; and
displaying the at least one of still or video images including displaying at least one of a reticle or an indication of a contact force between the alignment surface of the positioning device and the workpiece surface.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation (e.g., different steps, etc.) is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person of ordinary skill in the art to practice the various embodiments of the disclosure, including making and using any devices or systems and performing any incorporated methods. The patentable scope of the various embodiments of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A positioning device for positioning a drilling tool of a drilling apparatus relative to a workpiece, the positioning device comprising:
    a cage configured to be mounted to the drilling apparatus such that the cage at least partially surrounds the drilling tool of the drilling apparatus, the cage comprising an end portion that includes an alignment surface that is configured to be engaged in physical contact with a workpiece surface of the workpiece, the alignment surface of the cage being oriented relative to a centerline axis of the drilling tool when the cage is mounted to the drilling apparatus such that the centerline axis extends approximately normal to the workpiece surface when the alignment surface of the cage is in contact with the workpiece surface;
    a laser projector mounted to the cage such that the laser projector is configured to project an illuminated dot onto the workpiece surface that indicates where the centerline axis of the drilling tool intersects the workpiece surface when the alignment surface of the cage is in contact with the workpiece surface;
    a camera mounted to at least one of the cage or the drilling apparatus such that the camera is configured to acquire at least one of still images or video images of an area of the workpiece surface that includes the illuminated dot when the alignment surface of the cage is in contact with the workpiece surface;
    a display mounted to at least one of the cage or the drilling apparatus, the display being operatively connected to the camera for displaying the at least one of still or video images acquired by the camera; and
    at least one strain gauge mounted to the cage and configured to measure a load exerted on the cage by a contact force between the alignment surface of the cage and the workpiece surface.

2. The positioning device of claim 1, wherein the illuminated dot projected by the laser projector onto the workpiece surface is adjustably aligned with a target drilling location on the workpiece surface by moving the drilling apparatus relative to the workpiece surface.

3. The positioning device of claim 1, wherein the display is configured to display a reticle that is approximately centered on the illuminated dot projected by the laser projector.

4. The positioning device of claim 1, wherein the cage extends a length that extends along the centerline axis of the drilling tool when the cage is mounted to the drilling apparatus, the cage being rigid along the length thereof such that the drilling tool moves along the length of the cage toward the workpiece surface during operation of the drilling apparatus.

5. The positioning device of claim 1, wherein the cage is configured to collapse under a load exerted on the cage by a contact force between the cage and the workpiece surface as the drilling tool moves along the centerline axis toward the workpiece surface during operation of the drilling apparatus.

6. The positioning device of claim 1, wherein the cage extends a length that extends along the centerline axis of the drilling tool when the cage is mounted to the drilling apparatus, the cage being resiliently collapsible along the length thereof to guide movement of the drilling tool along the centerline axis toward the workpiece surface during operation of the drilling apparatus.

7. The positioning device of claim 1, wherein the drilling apparatus comprises a hand-held drilling apparatus and the cage is configured to be mounted to the hand-held drilling apparatus.

8. The positioning device of claim 1, wherein the cage includes a leg having an end surface that defines at least a portion of the alignment surface, the at least one strain gauge comprising a strain gauge mounted to the leg such that the strain gauge is configured to measure a load exerted on the cage by a contact force between the workpiece surface and the alignment surface of the leg, wherein the load measured by the strain gauge indicates the amount of the contact force that the alignment surface of the leg is applying to the workpiece surface at the location of the strain gauge.

9. The positioning device of claim 1, wherein the cage comprises at least two legs, the end portion of the cage being defined by end portions of the at least two legs, the alignment surface of the end portion of the cage being defined by end surfaces of the legs.

10. A drilling apparatus assembly comprising:
a drilling apparatus comprising:
  a body;
  a chuck held by the body; and
  a drilling tool held by the chuck; and
a positioning device mounted to the drilling apparatus for positioning the drilling tool relative to a workpiece, the positioning device comprising:
  a cage at least partially surrounding the drilling tool of the drilling apparatus, the cage comprising an end portion that includes an alignment surface that is configured to be engaged in physical contact with a workpiece surface of the workpiece, the alignment surface of the cage being oriented relative to a centerline axis of the drilling tool such that the centerline axis extends approximately normal to the workpiece surface when the alignment surface of the cage is in contact with the workpiece surface;
  a laser projector mounted to the cage such that the laser projector is configured to project an illuminated dot onto the workpiece surface that indicates where the centerline axis of the drilling tool intersects the workpiece surface when the alignment surface of the cage is in contact with the workpiece surface, wherein the illuminated dot projected by the laser projector onto the workpiece surface is adjustably aligned with a target drilling location on the workpiece surface by moving the drilling apparatus relative to the workpiece surface;
  a camera mounted to at least one of the cage or the drilling apparatus such that the camera is configured to acquire at least one of still images or video images of an area of the workpiece surface that includes the illuminated dot when the alignment surface of the cage is in contact with the workpiece surface;
  a display mounted to at least one of the cage or the drilling apparatus, the display being operatively connected to the camera for displaying the at least one of still or video images acquired by the camera; and
  at least one strain gauge mounted to the cage and configured to measure a load exerted on the cage by a contact force between the alignment surface of the cage and the workpiece surface.

11. The drilling apparatus assembly of claim 10, wherein the cage of the positioning device is configured to collapse under a load exerted on the cage by a contact force between the cage and the workpiece surface as the drilling tool moves along the centerline axis toward the workpiece surface during operation of the drilling apparatus.

12. The drilling apparatus assembly of claim 10, wherein the cage comprises at least two legs, the end portion of the cage being defined by end portions of the at least two legs, the alignment surface of the end portion of the cage being defined by end surfaces of the legs.

13. The drilling apparatus assembly of claim 10, wherein the display is configured to display a reticle that is approximately centered on the illuminated dot projected by the laser projector.

14. The drilling apparatus assembly of claim 10, wherein the cage extends a length that extends along the centerline axis of the drilling tool when the cage is mounted to the drilling apparatus, the cage being resiliently collapsible along the length thereof to guide movement of the drilling tool along the centerline axis toward the workpiece surface during operation of the drilling apparatus.

15. The drilling apparatus assembly of claim 10, wherein the drilling apparatus comprises a hand-held drilling apparatus and the cage is configured to be mounted to the hand-held drilling apparatus.

16. The drilling apparatus assembly of claim 10, wherein the cage includes a leg having an end surface that defines at least a portion of the alignment surface, the at least one strain gauge comprising a strain gauge mounted to the leg such that the strain gauge is configured to measure a load exerted on the cage by a contact force between the workpiece surface and the alignment surface of the leg, wherein the load measured by the strain gauge indicates the amount of the contact force that the alignment surface of the leg is applying to the workpiece surface at the location of the strain gauge.

* * * * *